US006952182B2

(12) United States Patent
Spilker, Jr. et al.

(10) Patent No.: US 6,952,182 B2
(45) Date of Patent: **\*Oct. 4, 2005**

(54) POSITION LOCATION USING INTEGRATED SERVICES DIGITAL BROADCASTING—TERRESTRIAL (ISDB-T) BROADCAST TELEVISION SIGNALS

(75) Inventors: James J. Spilker, Jr., Woodside, CA (US); Matthew Rabinowitz, Portola Valley, CA (US)

(73) Assignee: The Rosom Corporation, Redwood City, CA (US)

( * ) Notice: Subject to any disclaimer, the term of this patent is extended or adjusted under 35 U.S.C. 154(b) by 47 days.

This patent is subject to a terminal disclaimer.

(21) Appl. No.: 10/290,984

(22) Filed: Nov. 8, 2002

(65) Prior Publication Data

US 2003/0156063 A1 Aug. 21, 2003

Related U.S. Application Data

(63) Continuation-in-part of application No. 10/210,847, filed on Jul. 31, 2002, and a continuation-in-part of application No. 10/209,578, filed on Jul. 31, 2002, now Pat. No. 6,753,812, and a continuation-in-part of application No. 10/159,478, filed on May 31, 2002, and a continuation-in-part of application No. 09/932,010, filed on Aug. 17, 2001.

(60) Provisional application No. 60/337,834, filed on Nov. 9, 2001.

(51) Int. Cl.[7] .............................................. G01S 3/02
(52) U.S. Cl. ...................................................... 342/464
(58) Field of Search ....................... 342/357.01, 357.06, 342/453, 463, 464

(56) References Cited

U.S. PATENT DOCUMENTS 4,555,707 A 11/1985 Connelly
4,652,884 A 3/1987 Starker
4,894,662 A 1/1990 Counselman (Continued)

FOREIGN PATENT DOCUMENTS

GB 2 222 922 A 3/1990
GB 2 254 508 A 10/1992

OTHER PUBLICATIONS

Li, X., et al., "Indoor Geolocation Using OFDM Signals in HIPERLAN/2 Wireless LANS," 11th IEEE International Symposium on Personal Indoor and Mobile Radio Communications, PIMRC 2000, Proceedings (Cat. No. 00TH8525), Proceedings of 11th International Symposium on Personal Indoor and Mobile Radio Communcation, London, UK, Sep. 18–21, pp. 1449–1453, vol. 2, XPO1052087, 2000, Piscataway, NJ, USA, ISBN; 9–7803–6463–5, Chapter I and III.
Rabinowtiz, M., et al., "Positioning Using the ATSC Digital Television Signal," Rosum whitepaper, Online! 2001, XP002235053, Retrieved from the Internet on Mar. 13, 2003 at URL www.rosum.com/whitepaper 8–7–01.pdf.
EP Abstract/Zusammenfassung/Abrege, 02102666.1.
JP Abstract/vol. 007, No. 241 (P–232), Oct. 26, 1983 & JP58 129277 A (Nihon Musen KK) Aug. 2, 1983.

(Continued)

*Primary Examiner*—Dao Phan
(74) *Attorney, Agent, or Firm*—Richard A. Dunning, Jr.

(57) ABSTRACT

A method, apparatus, and computer-readable media for determining the position of a user terminal comprises receiving at the user terminal a digital television (DTV) broadcast signal from a DTV transmitter, wherein the DTV signal comprises an Integrated Services Digital Broadcasting-Terrestrial (ISDB-T) signal; determining a pseudo-range between the user terminal and the DTV transmitter based on a known component in the broadcast DTV signal; and determining a position of the user terminal based on the pseudo-range and a location of the DTV transmitter.

87 Claims, 10 Drawing Sheets

U.S. PATENT DOCUMENTS

| | | | |
|---|---|---|---|
| 5,045,861 | A | 9/1991 | Duffett-Smith |
| 5,157,686 | A | 10/1992 | Omura et al. |
| 5,166,952 | A | 11/1992 | Omura et al. |
| 5,323,322 | A | 6/1994 | Mueller et al. |
| 5,398,034 | A | 3/1995 | Spilker, Jr. |
| 5,481,316 | A | 1/1996 | Patel |
| 5,504,492 | A | 4/1996 | Class et al. |
| 5,510,801 | A | 4/1996 | Engelbrecht et al. |
| 5,774,829 | A | 6/1998 | Cisneros et al. |
| 5,920,284 | A | 7/1999 | Victor |
| 5,952,958 | A | 9/1999 | Speasl et al. |
| 5,953,311 | A | 9/1999 | Davies et al. |
| 6,078,284 | A | 6/2000 | Levanon |
| 6,094,168 | A | 7/2000 | Duffett-Smith et al. |
| 6,107,959 | A | 8/2000 | Levanon |
| 6,137,441 | A | 10/2000 | Dai et al. |
| 6,317,500 | B1 | 11/2001 | Murphy |
| 6,373,432 | B1 | 4/2002 | Rabinowitz et al. |
| 6,374,177 | B1 | 4/2002 | Lee et al. |
| 6,433,740 | B1 | 8/2002 | Gilhousen |
| 2003/0122711 | A1 | 7/2003 | Panasik et al. |

OTHER PUBLICATIONS

Parkinson, B.W., et al., "Autonomous GPS Integrity Monitoring Using the Pseudorange Residual," *Journal of the Institute of Navigation* (1988), vol. 35, No. 2, pp. 255–274.

Rabinowitz, M., "A Differential Center Phase Navigation System Combining GPS with Low Earth Orbit Satellites for Rapid Resulotion of Integer Cycle Ambiguities," *PhD Thesis for Department of Electrical Engineering, Standford University* (Dec. 2000), pp. 59–73.

Spilker, Jr., J.J., "Fundamentals of Signal Tracking Theory," *Global Positioning System: Theory and Applications* (1994), vol. 1, Chapter 7, pp. 245–327.

Van Dierendock, A.J., "GPS Receivers," *Global Positioning System: Theory and Applicatiosn* (1995), vol. 1, Chapter 8, pp. 329–407.

POSITION LOCATION USING INTEGRATED SERVICES DIGITAL BROADCASTING— TERRESTRIAL (ISDB-T) BROADCAST TELEVISION SIGNALS

CROSS-REFERENCE TO RELATED APPLICATIONS

This application is a continuation-in-part of U.S. patent application Ser. No. 10/210,847, "Position Location Using Broadcast Digital Television Signals" by James J. Spilker, Jr. and Matthew Rabinowitz, filed Jul. 31, 2002. This application is a continuation-in-part of U.S. patent application Ser. No. 09/932,010, "Position Location Using Terrestrial Digital Video Broadcast Television Signals" by Matthew Rabinowitz and James J. Spiker, filed Aug. 17, 2001. This application is a continuation-in-part of U.S. patent application Ser. No. 10/209,578, "Time-Gated Noncoherent Delay Lock Loop Tracking of Digital Television Signals" by James J. Spiker and Matthew Rabinowitz, filed Jul. 31, 2002, now U.S. Pat. No. 6,753,812. This application is a continuation-in-part of U.S. patent application Ser. No. 10/159,478, "Position Location Using Global Positioning Signals Augmented by Broadcast Television Signals" by Matthew Rabinowitz and James J. Spiker, filed May 31, 2002.

This application also claims the benefit of U.S. Provisional Patent Applications Ser. No. 60/337,834,"Wireless Position Location Using the Japanese ISDB-T Digital TV Signals, " by James J. Spilker, filed Nov. 9, 2001.

The subject matter of all of the foregoing are incorporated herein by reference.

BACKGROUND

The present invention relates generally to position determination, and particularly to position determination using digital television (DTV) signals.

There have long been methods of two-dimensional latitude/longitude position location systems using radio signals. In wide usage have been terrestrial systems such as Loran C and Omega, and a satellite-based system known as Transit. Another satellite-based system enjoying increased popularity is the Global Positioning System (GPS).

Initially devised in 1974, GPS is widely used for position location, navigation, survey, and time transfer. The GPS system is based on a constellation of 24 on-orbit satellites in sub-synchronous 12 hour orbits. Each satellite carries a precision clock and transmits a pseudo-noise signal, which can be precisely tracked to determine pseudo-range. By tracking 4 or more satellites, one can determine precise position in three dimensions in real time, world-wide. More details are provided in B. W. Parkinson and J. J. Spilker, Jr., Global Positioning System—Theory and Applications, Volumes I and II, AIAA, Washington, D.C. 1996.

GPS has revolutionized the technology of navigation and position location. However in some situations, GPS is less effective. Because the GPS signals are transmitted at relatively low power levels (less than 100 watts) and over great distances, the received signal strength is relatively weak (on the order of −160 dBw as received by an omni-directional antenna). Thus the signal is marginally useful or not useful at all in the presence of blockage or inside a building.

There has even been a proposed system using conventional analog National Television System Committee (NTSC) television signals to determine position. This proposal is found in a U.S. Patent entitled "Location Determination System And Method Using Television Broadcast Signals," U.S. Pat. No. 5,510,801, issued Apr. 23, 1996. However, the present analog TV signal contains horizontal and vertical synchronization pulses intended for relatively crude synchronization of the TV set sweep circuitry. Further, in 2006 the Federal Communication Commission (FCC) will consider turning off NTSC transmitters and reassigning that valuable spectrum so that it can be auctioned for other purposes deemed more valuable.

SUMMARY

In general, in one aspect, the invention features a method, apparatus, and computer-readable media for determining the position of a user terminal. It comprises receiving at the user terminal a digital television (DTV) broadcast signal from a DTV transmitter, wherein the DTV signal comprises an Integrated Services Digital Broadcasting-Terrestrial (ISDB-T) signal; determining a pseudo-range between the user terminal and the DTV transmitter based on a known component in the broadcast DTV signal; and determining a position of the user terminal based on the pseudo-range and a location of the DTV transmitter.

Particular implementations can include one or more of the following features. Determining a position of the user terminal comprises adjusting the pseudo-range based on a difference between a transmitter clock at the DTV transmitter and a known time reference; and determining the position of the user terminal based on the adjusted pseudo-range and the location of the DTV transmitter. The known component is a scattered pilot carrier. Determining a position of the user terminal comprises determining an offset between a local time reference in the user terminal and a master time reference; and determining the position of the user terminal based on the pseudo-range, the location of the DTV transmitter, and the offset. Implementations comprise determining a subsequent position of the user terminal using the offset. Determining a pseudo-range comprises storing a portion of the DTV signal; and subsequently correlating the stored portion and a signal generated by the user terminal to produce the pseudo-range. Determining a pseudo-range comprises correlating the DTV signal with a signal generated by the user terminal as the DTV signal is received to produce the pseudo-range. Determining a position of the user terminal comprises determining a general geographic area within which the user terminal is located; and determining the position of the user terminal based on the pseudo-range and the general geographic area. The general geographic area is a footprint of an additional transmitter communicably linked to the user terminal. Determining a position of the user terminal comprises determining a tropospheric propagation velocity in a vicinity of the user terminal; adjusting the pseudo-range based on the tropospheric propagation velocity; and determining the position of the user terminal based on the adjusted pseudo-range and the location of the DTV transmitter. Determining a position of the user terminal comprises adjusting the pseudo-range based on a terrain elevation in a vicinity of the user terminal; and determining the position of the user terminal based on the adjusted pseudo-range and the location of the DTV transmitter. Implementations comprise selecting the DTV signal from a plurality of DTV signals based on an identity of an additional transmitter communicably linked to the user terminal and a stored table correlating the additional transmitter and the DTV signals. Implementations comprise accepting a location input from a user; and selecting the DTV signal from a plurality of DTV signals based on the location input. Implementations comprise scanning available DTV signals to assemble a fingerprint of the location;

and selecting the DTV signal used to determine the pseudo-range from the available DTV signals based on the fingerprint and a stored table that matches known fingerprints with known locations. Implementations comprise using receiver autonomous integrity monitoring (RAIM) to check the integrity of the pseudo-range based on a redundant pseudo-range from the DTV transmitter.

In general, in one aspect, the invention features a method, apparatus, and computer-readable media for determining the position of a user terminal. It comprises receiving at the user terminal a digital television (DTV) broadcast signal from a DTV transmitter, wherein the DTV signal comprises a European Telecommunications Standards Institute (ETSI) Digital Video Broadcasting-Terrestrial (ISDB-T) signal; determining a pseudo-range between the user terminal and the DTV transmitter based on the DTV broadcast signal; and transmitting the pseudo-range to a location server configured to determine a position of the user terminal based on the pseudo-range and a location of the DTV transmitter.

Particular implementations can include one or more of the following features. Determining a pseudo-range comprises determining a time of transmission from the DTV transmitter of a known component of the DTV broadcast signal; determining a time of reception at the user terminal of the known component; and determining the difference between the time of transmission and the time of reception. The known component is a scattered pilot carrier. Determining a pseudo-range comprises storing a portion of the DTV signal; and subsequently correlating the stored portion and a signal generated by the user terminal to produce the pseudo-range. Determining a pseudo-range comprises correlating the DTV signal with a signal generated by the user terminal as the DTV signal is received to produce the pseudo-range.

In general, in one aspect, the invention features a method, apparatus, and computer-readable media for determining the position of a user terminal. It comprises receiving a pseudo-range from a user terminal, the pseudo-range determined between the user terminal and a DTV transmitter based on a DTV signal broadcast by the DTV transmitter, wherein the DTV signal comprises a European Telecommunications Standards Institute (ETSI) Digital Video Broadcasting-Terrestrial (ISDB-T) signal, and wherein the pseudo-range is determined based on a known component in the ISDB-T signal; and determining a position of the user terminal based on the pseudo-range and a location of the DTV transmitter.

Particular implementations can include one or more of the following features. Determining a position of the user terminal comprises adjusting the pseudo-range based on a difference between a transmitter clock at the DTV transmitter and a known time reference; and determining the position of the user terminal based on the adjusted pseudo-range and the location of the DTV transmitter. The known component is a scattered pilot carrier. Determining a position of the user terminal comprises determining an offset between a local time reference in the user terminal and a master time reference; and determining the position of the user terminal based on the pseudo-range, the location of the DTV transmitter, and the offset. Implementations comprise determining a subsequent position of the user terminal using the offset. Determining a position of the user terminal comprises determining a general geographic area within which the user terminal is located; and determining the position of the user terminal based on the pseudo-range and the general geographic area. The general geographic area is a footprint of an additional transmitter communicably linked to the user terminal. Determining a position of the user terminal comprises determining a tropospheric propagation velocity in a vicinity of the user terminal; adjusting the pseudo-range based on the tropospheric propagation velocity; and determining the position of the user terminal based on the adjusted pseudo-range and the location of the DTV transmitter. Determining a position of the user terminal comprises adjusting the pseudo-range based on the terrain elevation in the vicinity of the user terminal; and determining the position of the user terminal based on the adjusted pseudo-range and the location of the DTV transmitter.

Advantages that can be seen in implementations of the invention include one or more of the following. Implementations of the invention may be used to position cellular telephones, wireless PDA's (personal digital assistant), pagers, cars, OCDMA (orthogonal code-division multiple access) transmitters and a host of other devices. Implementations of the inventions make use of a DTV signal which has excellent coverage. Implementations of the present invention require no changes to the Digital Broadcast Stations.

The DTV signal has a power advantage over GPS of more than 50 dB, and substantially superior geometry to that which a satellite system could provide, thereby permitting position location even in the presence of blockage and indoors. The DTV signal has roughly eight times the bandwidth of GPS, thereby minimizing the effects of multipath. Due to the high power and sparse frequency components of the DTV signal used for ranging, the processing requirements are minimal. Implementations of the present invention accommodate far cheaper, lower-speed, and lower-power devices than a GPS technique would require.

In contrast to satellite systems such as GPS, the range between the DTV transmitters and the user terminals changes very slowly. Therefore the DTV signal is not significantly affected by Doppler effects. This permits the signal to be integrated for a long period of time, resulting in very efficient signal acquisition.

The frequency of the DTV signal is substantially lower that that of conventional cellular telephone systems, and so has better propagation characteristics. For example, the DTV signal experiences greater diffraction than cellular signals, and so is less affected by hills and has a larger horizon. Also, the signal has better propagation characteristics through buildings and automobiles. Further, implementations of the present invention utilize a component of the ISDB-T signal that is continuous and constitutes a large percentage of the power of the ISDB-T signal.

Unlike the terrestrial Angle-of-Arrival/Time-of-Arrival positioning systems for cellular telephones, implementations of the present invention require no change to the hardware of the cellular base station, and can achieve positioning accuracies on the order of 1 meter. When used to position cellular phones, the technique is independent of the air interface, whether GSM (global system mobile), AMPS (advanced mobile phone service), TDMA (time-division multiple access), CDMA, or the like. A wide range of UHF (ultra-high frequency) frequencies has been allocated to DTV transmitters. Consequently, there is redundancy built into the system that protects against deep fades on particular frequencies due to absorption, multipath and other attenuating effects.

The details of one or more embodiments of the invention are set forth in the accompanying drawings and the description below. Other features, objects, and advantages of the invention will be apparent from the description and drawings, and from the claims.

DETAILED DESCRIPTION

Introduction

Figure 1:
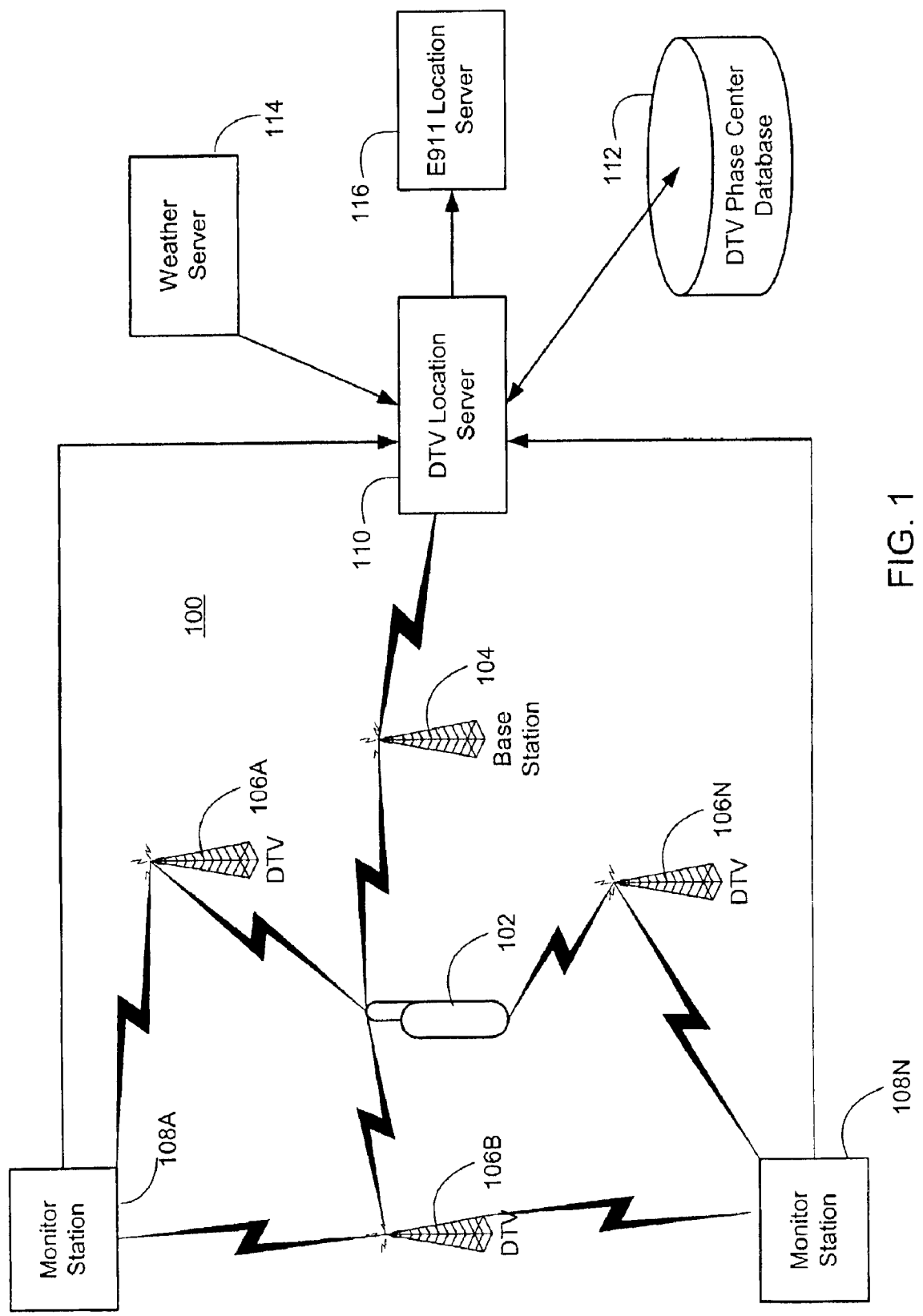
FIG. 1 depicts an implementation of the present invention.

Digital television (DTV) is growing in popularity. DTV was first implemented in the United States in 1998. As of the end of 2000, 167 stations were on the air broadcasting the DTV signal. As of Feb. 28, 2001, approximately 1200 DTV construction permits had been acted on by the FCC. According to the FCC's objective, all television transmission will soon be digital, and analog signals will be eliminated. Public broadcasting stations must be digital by May 1, 2002 in order to retain their licenses. Private stations must be digital by May 1, 2003. Over 1600 DTV transmitters are expected in the United States. Other regions are implementing similar DTV systems. The Japan Broadcasting Corp. (NHK) has defined a terrestrial DTV signal for Japan, referred to herein as the Integrated Services Digital Broadcasting-Terrestrial (ISDB-T) signal. These new DTV signals permit multiple TV signals to be transmitted in the assigned 6 MHz channel. These new ISDB-T DTV signals are completely different from the analog NTSC TV signals, and have completely new capabilities. The inventors have recognized that the ISDB-T signal can be used for position location, and have developed techniques for doing so. These techniques are usable in the vicinity of ISDB-T DTV transmitters with a range from the transmitter much wider than the typical TV reception range. Because of the high power of the DTV signals, these techniques can even be used indoors by handheld receivers, and thus provide a possible solution to the position location needs of the Enhanced 911 (E911) system.

The techniques disclosed herein can be applied to other DTV signals that include known sequences of data by simply modifying the correlator to accommodate the known sequence of data, as would be apparent to one skilled in the relevant arts. These techniques can also be applied to a range of other orthogonal frequency-division multiplexing (OFDM) signals such as satellite radio signals.

In contrast to the digital pseudo-noise codes of GPS, the DTV signals are received from transmitters only a few miles distant, and the transmitters broadcast signals at effective radiated powers of up to several hundred kilowatts. In addition the DTV transmitter antennas have significant antenna gain, on the order of 14 dB. Thus there is often sufficient power to permit DTV signal reception inside buildings.

As described below, implementations of the present invention utilize a component of the ISDB-T signal that is referred to as the "scattered pilot signal." The use of the scattered pilot signal is advantageous for several reasons. First, it permits position determination indoors, and at great distances from DTV transmitters. Conventional DTV receivers utilize only one data signal at a time, and so are limited in range from the DTV transmitter by the energy of a single signal. In contrast, implementations of the present invention utilize the energy of multiple scattered pilot signals simultaneously, thereby permitting operation at greater range from DTV transmitters than conventional DTV receivers. Further, the scattered pilots are not modulated by data. This is advantageous for two reasons. First, all of the power in the scattered pilots is available for position determination; none of the power is devoted to data. Second, the scattered pilots can be observed for long periods of time without suffering the degradation that data modulation would produce. Thus the ability to track signals indoors at substantial range from the DTV tower is greatly expanded. Furthermore, through the use of digital signal processing it is possible to implement these new tracking techniques in a single semiconductor chip.

Referring to FIG. 1, an example implementation 100 includes a user terminal 102 that communicates over an air link with a base station 104. In one implementation, user terminal 102 is a wireless telephone and base station 104 is a wireless telephone base station. In one implementation, base station 104 is part of a mobile MAN (metropolitan area network) or WAN (wide area network).

FIG. 1 is used to illustrate various aspects of the invention but the invention is not limited to this implementation. For example, the phrase "user terminal" is meant to refer to any object capable of implementing the DTV position location described. Examples of user terminals include PDAs, mobile phones, cars and other vehicles, and any object which could include a chip or software implementing DTV position location. It is not intended to be limited to objects which are "terminals" or which are operated by "users."

Position Location Performed by a DTV Location Server

Figure 2:
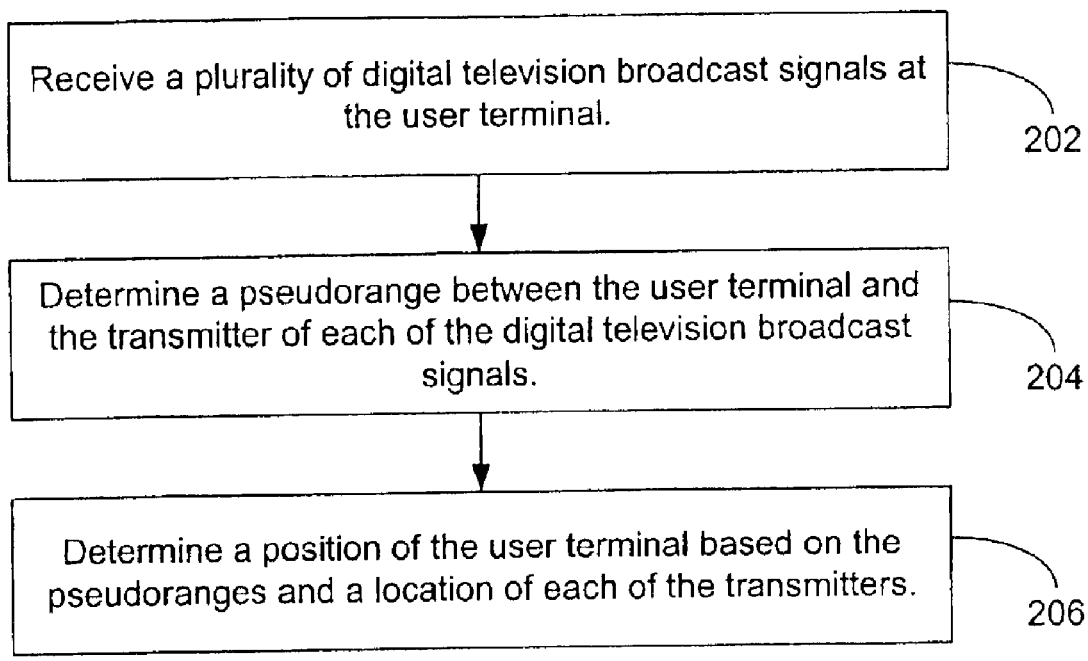
FIG. 2 illustrates an operation of implementation.

FIG. 2 illustrates an operation of implementation 100. User terminal 102 receives DTV signals from a plurality of DTV transmitters 106A and 106B through 106N (step 202).

Various methods can be used to select which DTV channels to use in position location. In one implementation, a DTV location server 110 tells user terminal 102 of the best DTV channels to monitor. In one implementation, user terminal 102 exchanges messages with DTV location server 110 by way of base station 104. In one implementation user terminal 102 selects DTV channels to monitor based on the identity of base station 104 and a stored table correlating base stations and DTV channels. In another implementation, user terminal 102 can accept a location input from the user that gives a general indication of the area, such as the name of the nearest city; and uses this information to select DTV channels for processing. In one implementation, user terminal 102 scans available DTV channels to assemble a fingerprint of the location based on power levels of the available DTV channels. User terminal 102 compares this fingerprint to a stored table that matches known fingerprints with known locations to select DTV channels for processing. This selection is based on the power levels of the DTV channels, as well as the directions from which each of the signals are arriving, so as to minimize the dilution of precision (DOP) for the position calculation.

User terminal 102 determines a pseudo-range between the user terminal 102 and each DTV transmitter 106 (step 204). Each pseudo-range represents the time difference (or equivalent distance) between a time of transmission from a transmitter 108 of a component of the DTV broadcast signal and a time of reception at the user terminal 102 of the component, as well as a clock offset at the user terminal.

User terminal 102 transmits the pseudo-ranges to DTV location server 110. In one implementation, DTV location server 110 is implemented as a general-purpose computer executing software designed to perform the operations described herein. In another implementation, DTV location server is implemented as an ASIC (application-specific integrated circuit). In one implementation, DTV location server 110 is implemented within or near base station 104.

The DTV signals are also received by a plurality of monitor units 108A through 108N. Each monitor unit can be implemented as a small unit including a transceiver and processor, and can be mounted in a convenient location such as a utility pole, DTV transmitters 106, or base stations 104. In one implementation, monitor units are implemented on satellites.

Each monitor unit 108 measures, for each of the DTV transmitters 106 from which it receives DTV signals, a time offset between the local clock of that DTV transmitter and a reference clock. In one implementation the reference clock is derived from GPS signals. The use of a reference clock permits the determination of the time offset for each DTV transmitter 106 when multiple monitor units 108 are used, since each monitor unit 108 can determine the time offset with respect to the reference clock. Thus, offsets in the local clocks of the monitor units 108 do not affect these determinations.

In another implementation, no external time reference is needed. According to this implementation, a single monitor unit receives DTV signals from all of the same DTV transmitters as does user terminal 102. In effect, the local clock of the single monitor unit functions as the time reference.

In one implementation, each time offset is modeled as a fixed offset. In another implementation each time offset is modeled as a second order polynomial fit of the form $$\text{Offset}=a+b(t-T)+c(t-T)^2 \quad (1)$$

that can be described by a, b, c, and T. In either implementation, each measured time offset is transmitted periodically to the DTV location server using the Internet, a secured modem connection, as part of the actual DTV broadcast data, or the like. In one implementation, the location of each monitor unit 108 is determined using GPS receivers.

DTV location server 110 receives information describing the phase center (i.e., the location) of each DTV transmitter 106 from a database 112. In one implementation, the phase center of each DTV transmitter 106 is measured by using monitor units 108 at different locations to measure the phase center directly. One approach to doing this is to use multiple time-synchronized monitor units at known locations. These units make pseudo-range measurements to a TV transmitter at the same time instant, and those measurements can be used to inverse-triangulate the location of the TV transmitter phase centers. In another implementation, the phase center of each DTV transmitter 106 is measured by surveying the antenna phase center. Once determined, the phase centers are stored in a data base 112.

In one implementation, DTV location server 110 receives weather information describing the air temperature, atmospheric pressure, and humidity in the vicinity of user terminal 102 from a weather server 114. The weather information is available from the Internet and other sources. DTV location server 110 determines tropospheric propagation velocity from the weather information using techniques such as those disclosed in B. Parkinson and J. Spilker, Jr. Global Positioning System-Theory and Applications, AIAA, Washington, D.C., 1996, Vol. 1, Chapter 17 Tropospheric Effects on GPS by J. Spilker, Jr.

DTV location server 110 can also receive from base station 104 information which identifies a general geographic location of user terminal 102. For example, the information can identify a cell or cell sector within which a cellular telephone is located. This information is used for ambiguity resolution, as described below.

Figure 3:
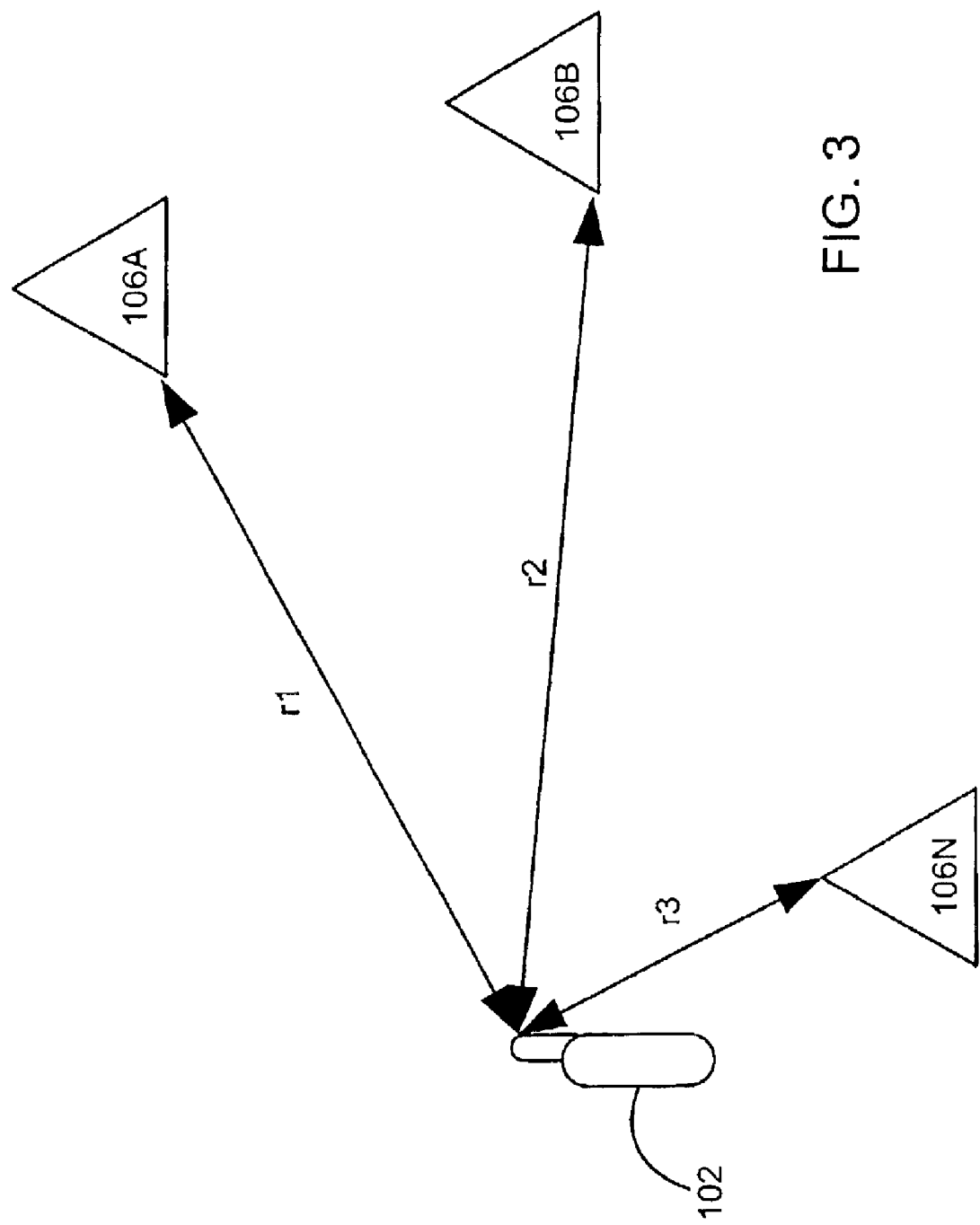
FIG. 3 depicts the geometry of a position determination using three DTV transmitters.

DTV location server 110 determines a position of the user terminal based on the pseudo-ranges and a location and clock offset of each of the transmitters (step 206). FIG. 3 depicts the geometry of a position determination using three DTV transmitters 106. DTV transmitter 106A is located at position (x1, y1). The range between user terminal 102 and DTV transmitter 106A is r1. DTV 106B transmitter is located at position (x2, y2). The range between user terminal 102 and DTV transmitter 106B is r2. DTV transmitter 106N is located at position (x3, y3). The range between user terminal 102 and DTV transmitter 106N is r3.

DTV location server 110 may adjust the value of each pseudo-range according to the tropospheric propagation velocity and the time offset for the corresponding DTV transmitter 106. DTV location server 110 uses the phase center information from database 112 to determine the position of each DTV transmitter 106.

User terminal 102 makes three or more pseudo-range measurements to solve for three unknowns, namely the position (x, y) and clock offset T of user terminal 102. In other implementations, the techniques disclosed herein are used to determine position in three dimensions such as longitude, latitude, and altitude, and can include factors such as the altitude of the DTV transmitters.

The three pseudo-range measurements pr1, pr2 and pr3 are given by $$pr1=r1+T \quad (2)$$

$$pr2=r2+T \quad (3)$$

$$pr3=r3+T \quad (4)$$

The three ranges can be expressed as $$r1=|X-X1| \quad (5)$$

$$r2=|X-X2| \quad (6)$$

$$r3=|X-X3| \quad (7)$$

where X represents the two-dimensional vector position (x, y) of user terminal, X1 represents the two-dimensional vector position (x1, y1) of DTV transmitter 106A, X2 represents the two-dimensional vector position (x2, y2) of DTV transmitter 106B, and X3 represents the two-dimensional vector position (x3, y3) of DTV transmitter 106N. These relationships produce three equations in which to solve for the three unknowns x, y, and T. DTV locations server 110 solves these equations according to conventional well-known methods. In an E911 application, the position of user terminal 102 is transmitted to E911 location server 116 for distribution to the proper authorities. In another application, the position is transmitted to user terminal 102.

Now, techniques for projecting the measurements at the user terminal 102 to a common instant in time are described. Note that this is not necessary if the clock of the user terminal 102 is stabilized or corrected using a signal from the cellular base station or a DTV transmitter 106. When the user clock is not stabilized, or corrected, the user clock offset can be considered to be a function of time, T(t). For a small time interval, Δ, the clock offset, T(t), can be modeled by a constant and a first order term. Namely, $$T(t+\Delta) = T(t) + \frac{\partial T}{\partial t}\Delta \quad (8)$$

We now reconsider equations (2a)–(4a) treating the clock offset as a function of time. Consequently, the pseudo-range measurements are also a function of time. For clarity, we assume that the ranges remain essentially constant over the interval Δ. The pseudo-range measurements may be described as:

$$pr1\ (t1) = r1 + T(t1) \quad (2b)$$

$$pr2\ (t2) = r2 + T(t2) \quad (3b)$$

$$prN(tN) = rN + T(tN) \quad (4b)$$

In one embodiment, the user terminal 102 commences with an additional set of pseudo-range measurements at some time Δ after the initial set of measurements. These measurements may be described:

$$pr1(t1+\Delta) = r1 + T(t1) + \frac{\partial T}{\partial t}\Delta \quad (2c)$$

$$pr2(t2+\Delta) = r2 + T(t2) + \frac{\partial T}{\partial t}\Delta \quad (3c)$$

$$prN(tN+\Delta) = rN + T(tN) + \frac{\partial T}{\partial t}\Delta \quad (4c)$$

The user terminal 102 then projects all the pseudo-range measurements to some common point in time so that the effect of the first order term is effectively eliminated. For example, consider if some common reference time t0 is used. Applying equations (2b–4b) and (2c–4c) it is straightforward to show that we can project the measurements to a common instant of time as follows:

$$pr1(t0) = pr1(t1) + [pr1(t1+\Delta) - pr1(t1)](t0-t1)/\Delta \quad (2d)$$

$$pr2\ (t0) = pr2(t2) + [pr2(t2+\Delta) - pr2(t2)](t0-t2)/\Delta \quad (3d)$$

$$prN(t0) = prN(tN) + [prN(tN+\Delta) - prN(tN)](t0-tN)/\Delta \quad (4d)$$

These projected pseudo-range measurements are communicated to the location server where they are used to solve the three unknowns x, y, and T. Note that the projection in equations (2d–4d) is not precise, and second order terms are not accounted for. However the resulting errors are not significant. One skilled in the art will recognize that second order and higher terms may be accounted for by making more than two pseudo-range measurements for each projection. Notice also that there are many other approaches to implementing this concept of projecting the pseudo-range measurements to the same instant of time. One approach, for example, is to implement a delay lock loop such as those disclosed in J. J. Spilker, Jr., Digital Communications by Satellite, Prentice-Hall, Englewood Cliffs, N.J., 1977, 1995 and B. W. Parkinson and J. J. Spilker, Jr., Global Positioning System-Theory and Application, Volume 1, AIAA, Washington, D.C. 1996, both incorporated by reference herein. A separate tracking loop can be dedicated to each DTV transmitter 106. These tracking loops effectively interpolate between pseudo-range measurements. The state of each of these tracking loops is sampled at the same instant of time.

In another implementation, user terminal 102 does not compute pseudo-ranges, but rather takes measurements of the DTV signals that are sufficient to compute pseudo-range, such as a segment of the correlator output, and transmits these measurements to DTV location server 110. DTV location server 110 then computes the pseudo-ranges based on the measurements, and computes the position based on the pseudo-ranges, as described above.

Position Location Performed by User Terminal

In another implementation, the position of user terminal 102 is computed by user terminal 102. In this implementation, all of the necessary information is transmitted to user terminal 102. This information can be transmitted to user terminal by DTV location server 110, base station 104, one or more DTV transmitters 106, or any combination thereof. User terminal 102 then measures the pseudo-ranges and solves the simultaneous equations as described above. This implementation is now described.

User terminal 102 receives the time offset between the local clock of each DTV transmitter and a reference clock. User terminal 102 also receives information describing the phase center of each DTV transmitter 106 from a database 112.

User terminal 102 receives the tropospheric propagation velocity computed by DTV locations server 110. In another implementation, user terminal 102 receives weather information describing the air temperature, atmospheric pressure, and humidity in the vicinity of user terminal 102 from a weather server 114, and determines tropospheric propagation velocity from the weather information using conventional techniques.

User terminal 102 can also receive from base station 104 information which identifies the rough location of user terminal 102. For example, the information can identify a cell or cell sector within which a cellular telephone is located. This information is used for ambiguity resolution, as described below.

User terminal 102 receives DTV signals from a plurality of DTV transmitters 106 and determines a pseudo-range between the user terminal 102 and each DTV transmitter 106. User terminal 102 then determines its position based on the pseudo-ranges and the phase centers of the transmitters.

In any of these of the implementations, should only two DTV transmitters be available, the position of user terminal 102 can be determined using the two DTV transmitters and the offset T computed during a previous position determination. The values of T can be stored or maintained according to conventional methods. This assumes, of course, that the local clock is stable enough over the period of time since T was computed.

In one implementation, base station 104 determines the clock offset of user terminal 102. In this implementation, only two DTV transmitters are required for position determination. Base station 104 transmits the clock offset T to DTV location server 110, which then determines the position of user terminal 102 from the pseudo-range computed for each of the DTV transmitters.

Figure 4:
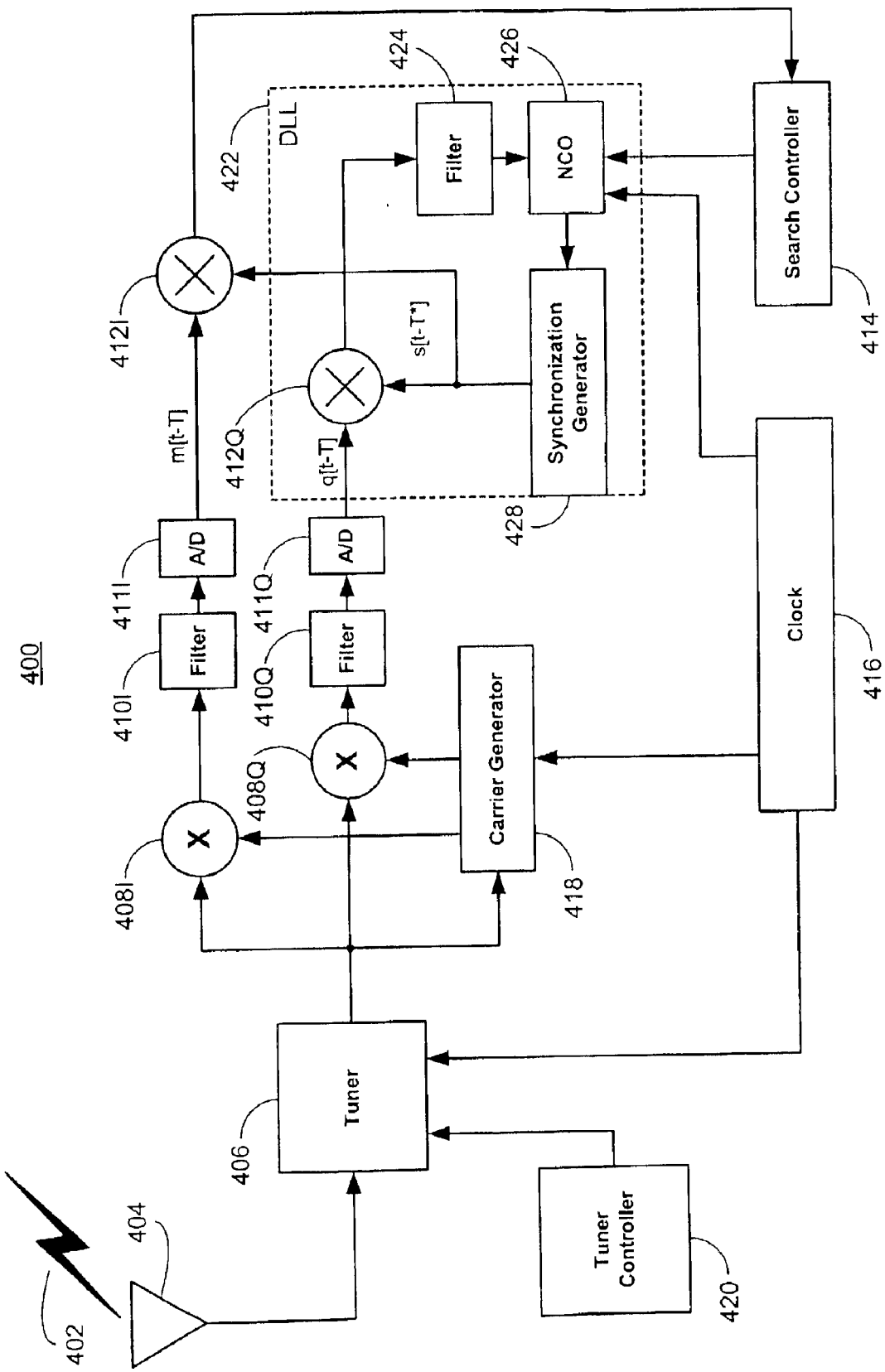
FIG. 4 depicts an implementation of a receiver for use in generating a pseudo-range measurement.

In another implementation, when only one or two DTV transmitters are available for position determination, GPS is used to augment the position determination, and each GPS satellite is treated as another transmitter in the positioning solution Receiver Architecture FIG. 4 depicts an implementation 400 of a receiver for use in generating a pseudo-range measurement. In one implementation, receiver 400 is implemented within user terminal 102. In another implementation, receiver 400 is implemented within a monitor unit 108.

Tuner 406, clocked by a clock 416, tunes antenna 404 to a DTV signal 402 in the area in response to control signals provided by tuner controller 420. In some embodiments, tuner 406 also downconverts the received DTV signal(s) to intermediate frequency (IF). Mixers 408I and 408Q combine the carrier signal produced by carrier generator 418 with the tuned DTV signal to produce in-phase and quadrature DTV signals at intermediate frequency (IF) or baseband. In one embodiment, clock 416 runs at 27 MHz. Each of these signals is filtered by one of filters 410I and 410Q, and digitized by one of analog-to-digital converters (A/D) 411I and 411Q, to produce signals m[t−T] and q[t−T], respectively. In alternative embodiments, a single A/D converter with a switch is used to alternately sample the in-phase and quadrature channels. A correlator 412I combines signal m[t−T] with a synchronization signal s[t−T*], and provides the correlation output to a search controller 414.

A delay-lock loop 422 comprises a correlator 412Q, a filter 424, a number-controlled oscillator (NCO) 426 clocked by clock 416, and a synchronization generator 428 that generates a digital representation of the scattered pilot signals. Correlator 412Q combines signal q[t−T] with synchronization signal signals s[t−T*], and provides the correlation output, after filtering by filter 424, to NCO 426. NCO 426 drives synchronization generator 428 according to search controller 414.

Control is provided by search controller 414 during signal acquisition, and by NCO 426 during signal tracking after acquisition. A pseudo-range is obtained by sampling NCO 426.

Note that the position location operation at the subscriber handset or other device need only take place when the subscriber needs position location. For a subscriber walking slowly, in a slowly moving vehicle, or sitting in a building or field in an emergency, this location information need only be measured infrequently. Thus the battery or other power source can be very small.

Of course, other versions of receiver 400 can be implemented using the concepts described above, for example by processing the received DTV signal using fast Fourier transform (FFT) methods. In addition, one can simply digitize the sum of the 9 chirp signals, or all 117 chirp carriers, and perform in a quasi-optimal manner.

Important to achieving this performance is the concept of correlating with all scattered pilots in parallel, or at least with the 9 in a single segment. Wider bandwidths of the composite signal provide greater position location accuracy. The timing accuracy is inversely proportional to the bandwidth.

Other signals within the ISDB-T structure can also be used for position location. For example, a wide laning technique could be applied to the continuous pilot signals. However, such techniques as wide laning involve inherent resolution of cycle ambiguities Techniques for resolving such ambiguities are well-known in the art.

The user terminal local oscillator is often of relatively poor stability in frequency. This instability affects two different receiver parameters. First, it causes a frequency offset in the receiver signal. Second, it causes the received bit pattern to slip relative to the symbol rate of the reference clock. Both of these effects can limit the. integration time of the receiver and hence the processing gain of the receiver. The integration time can be increased by correcting the receiver reference clock. In one implementation a delay lock loop automatically corrects for the receiver clock.

Position Location Enhancements

Figure 5:
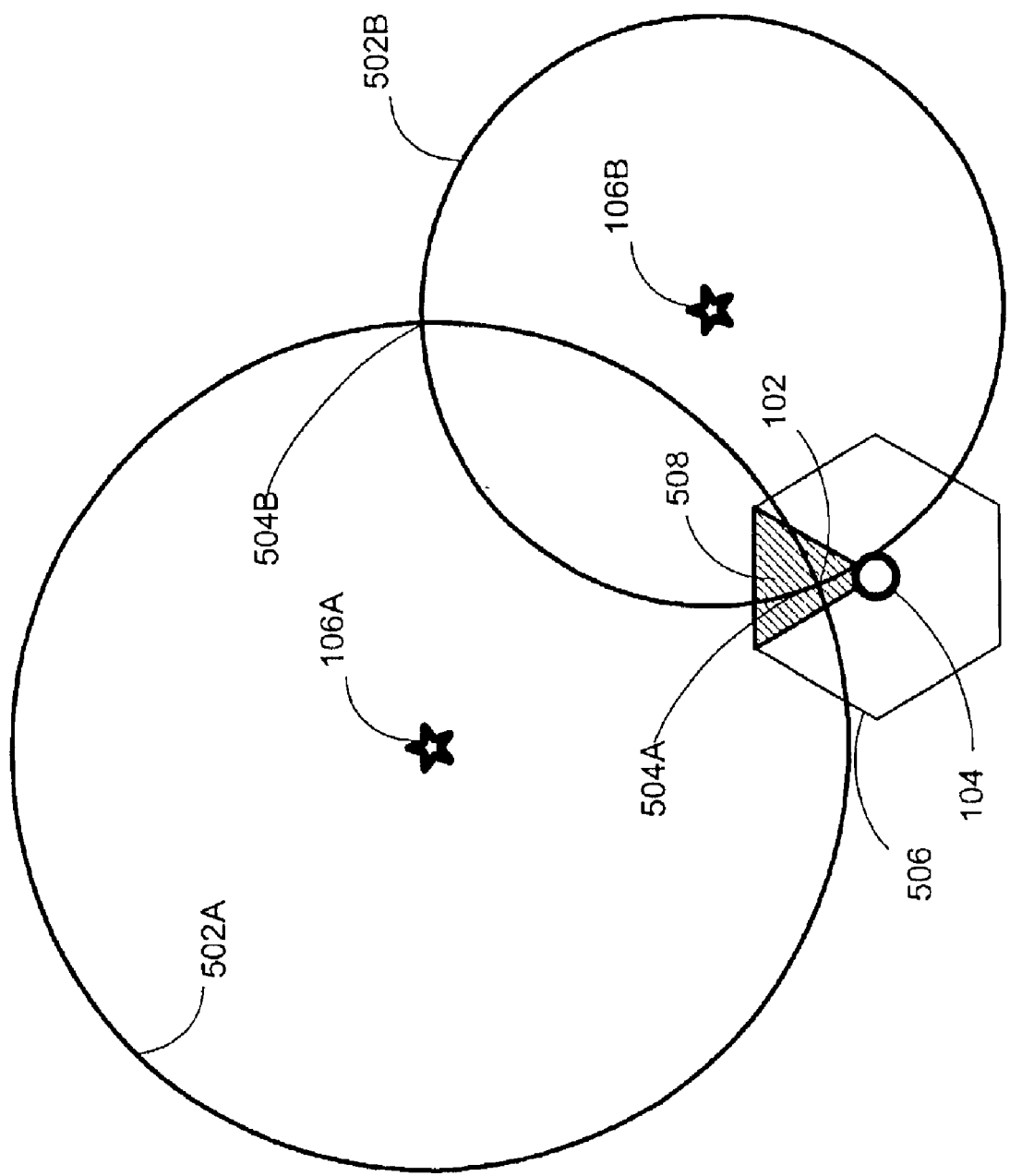
FIG. 5, describes a simplified example of a position location calculation for a user terminal.

The a-priori knowledge of the location of the cellular site can be used to enhance the position determination. This is conceptually illustrated in FIG. 5, which describes a simplified example of a position location calculation for a user terminal 102 receiving DTV signals from two separate DTV antennas 106A and 106B. For this simplified example, it is assumed that the user's clock offset is already known. Based on the range measurements, circles of constant range 502A and 502B are drawn about each of transmit antennas 106A and 106B, respectively. The position for a user terminal, including correction for the user terminal clock offset, is then at one of the intersections 504A and 504B of the two circles 502A and 502B. The ambiguity is resolved by noting that base station 104 can determine in which sector 508 of its footprint (that is, its coverage area) 506 the user terminal is located. Of course if there are more than two DTV transmitters in view, the ambiguity can be resolved by taking the intersection of three circles. Since the synchronization codes from TV transmitters are repetitive in nature, a cycle ambiguity exists, determined by the repetition period of the TV synch code, which results in a distance ambiguity equal to the repetition period times by the speed of light. This cycle ambiguity may be resolved by the same technique described for the simplified example of FIG. 5 as long as the distance ambiguity is large in comparison with the size of the cell site, which is typically the case.

In one implementation, instead of using the cell site to initially determine a rough location, user terminal 102 can accept an input from a user that gives a general indication of the area, such as the name of the nearest city. In one implementation, user terminal 102 scans available DTV channels to assemble a fingerprint of the location describing the set of visible channels. User terminal 102 compares this fingerprint to a stored table that matches known fingerprints with known locations to identify the current rough location of user terminal 102.

Figure 6:
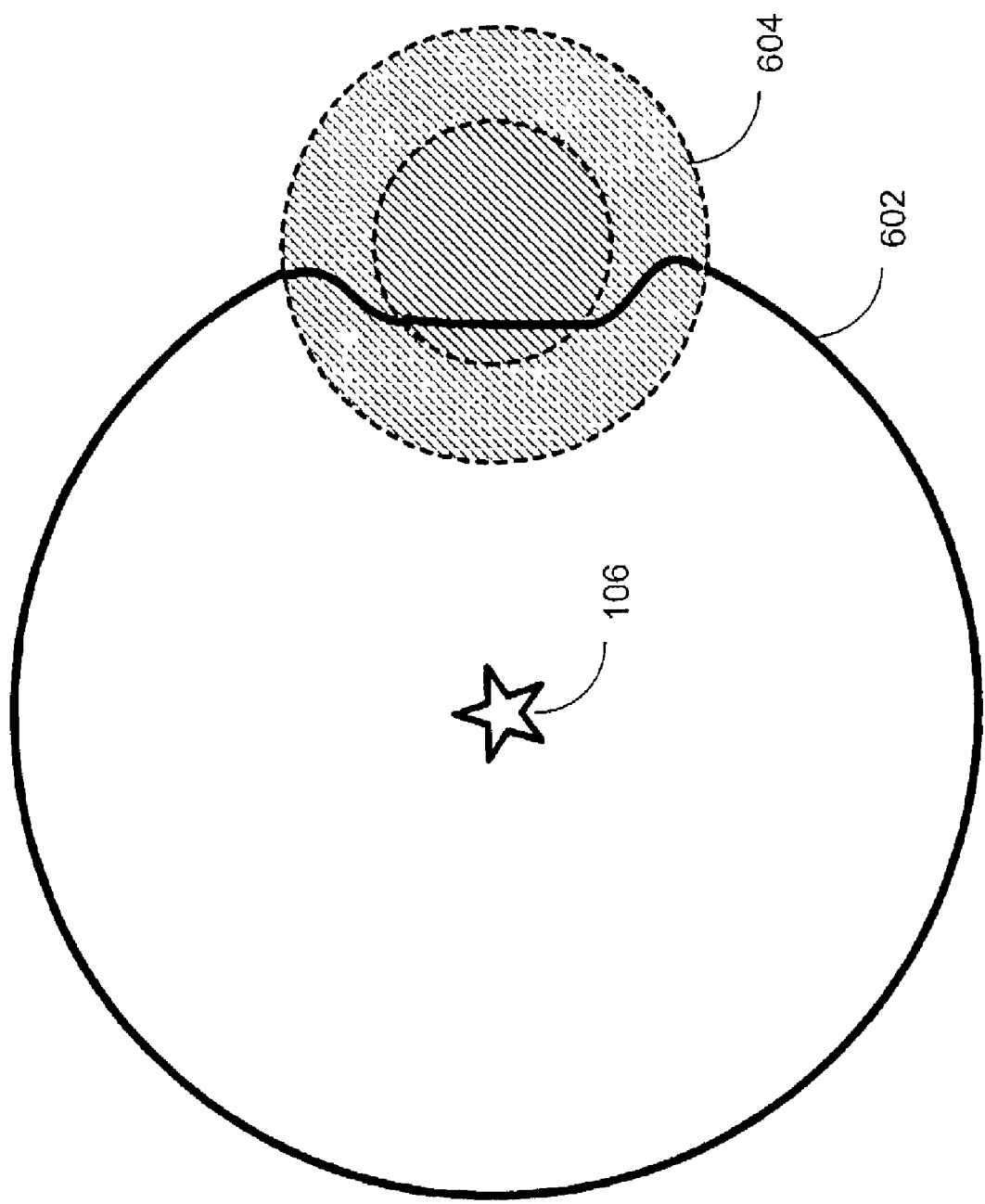
FIG. 6 depicts the effects of a single hill on a circle of constant range for a DTV transmitter that is located at the same altitude as the surrounding land.

In one implementation the position location calculation includes the effects of ground elevation. Thus in terrain with hills and valleys relative to the phase center of the DTV antenna 106 the circles of constant range are distorted. FIG. 6 depicts the effects of a single hill 604 on a circle of constant range 602 for a DTV transmitter 106 that is located at the same altitude as the surrounding land.

The computations of user position are easily made by a simple computer having as its database a terrain topographic map which allows the computations to include the effect of user altitude on the surface of the earth, the geoid. This calculation has the effect of distorting the circles of constant range as shown in FIG. 6.

ISDB-T Signal Description

The ISDB-T signal is a complex orthogonal frequency-division multiplexing (OFDM) signal that carries 188 Byte MPEG (Moving Picture Expert Group) packets using either 1512 or 6048 separate carriers. Most of these components carry the random-like data modulation of the video TV signals and is less useful for precision tracking at low signal levels. Note that for our purposes of position location, the user terminal may be in locations where the entire information content of the ISDB-T signal is not available.

The ISDB-T signal is a band segmented transmission (BST) orthogonal frequency-division multiplexing (OFDM) signal which has the capability to deliver a variety of video, sound and data services. Because it is an OFDM system, it is resistant to multipath. The use of the so-called band segmented transmission permits flexibility in the information transmitted. The segments have a bandwidth of 3000/7=428.5714286 kHz.

The ISDB-T signal contains synchronization components which are very useful for position location. The signal has both wide-band and narrow-band formats. The wide-band format has a bandwidth of 5.6 MHz, and is used for television and data. The narrow-band format has a bandwidth of 430 KHz, and is used for lower bandwidth signaling. The signal characteristics for the three modes of the wide-bandwidth format are listed in Table 1. The carrier spacing is the inverse of the useful symbol duration. The coherently modulated segments have scattered pilots; the differentially coherent segment have continuous pilots. For each mode, the total number of segments is Ns=13=ns+nd. In this section one of the three modes of the wide-bandwidth format is described; however, the same concepts apply to all three modes.

TABLE 1

| Parameter | 2K mode | 8K mode |
| --- | --- | --- |
| Number of carriers K | 1705 | 6817 |
| Symbol Duration | 224 microseconds | 896 microseconds |
| Carrier spacing | 4464 Hz | 1116 Hz |
| Total spacing of signal | 7.61 MHz | 7.61 MHz |

The wideband signal is composed of 13 OFDM segments where each segment is composed of 108 frequencies. The bandwidth of an OFDM segment of 108 carriers is 430 kHz. The OFDM carriers are for the most part modulated by video information in MPEG-2 format using quadrature amplitude modulation (QAM) modulation and powerful error correction coding. However, within that set of 108 frequencies some are set aside for synchronization; these are the so-called scattered and continuous pilots. Some embodiments of the invention use the continuous pilots for center frequency measurement. However the scattered pilots are more useful for high-accuracy position measurement.

The ISDB-T standard provides for a number of modulation schemes including differential quadrature phase shift keying (DQPSK), quadrature phase shift keying (QPSK), 16 QAM, 64 QAM, and coding rates for the inner code of ½, ⅔, ¾, ⅚, and ⅞. These parameters can be selected independently for each of the segments. The total data rate for the wideband mode is only 3.651 Mbps for the differentially coherent modulation DQPSK. The narrowband single segment mode produces a data rate of 280.85 kbps for the DQPSK modulation and rate ½ coding. The other modes are coherent and produce data rates of up to 23.234 Mbps for the 64 QAM mode with an inner code of rate ⅞.

Figure 7:
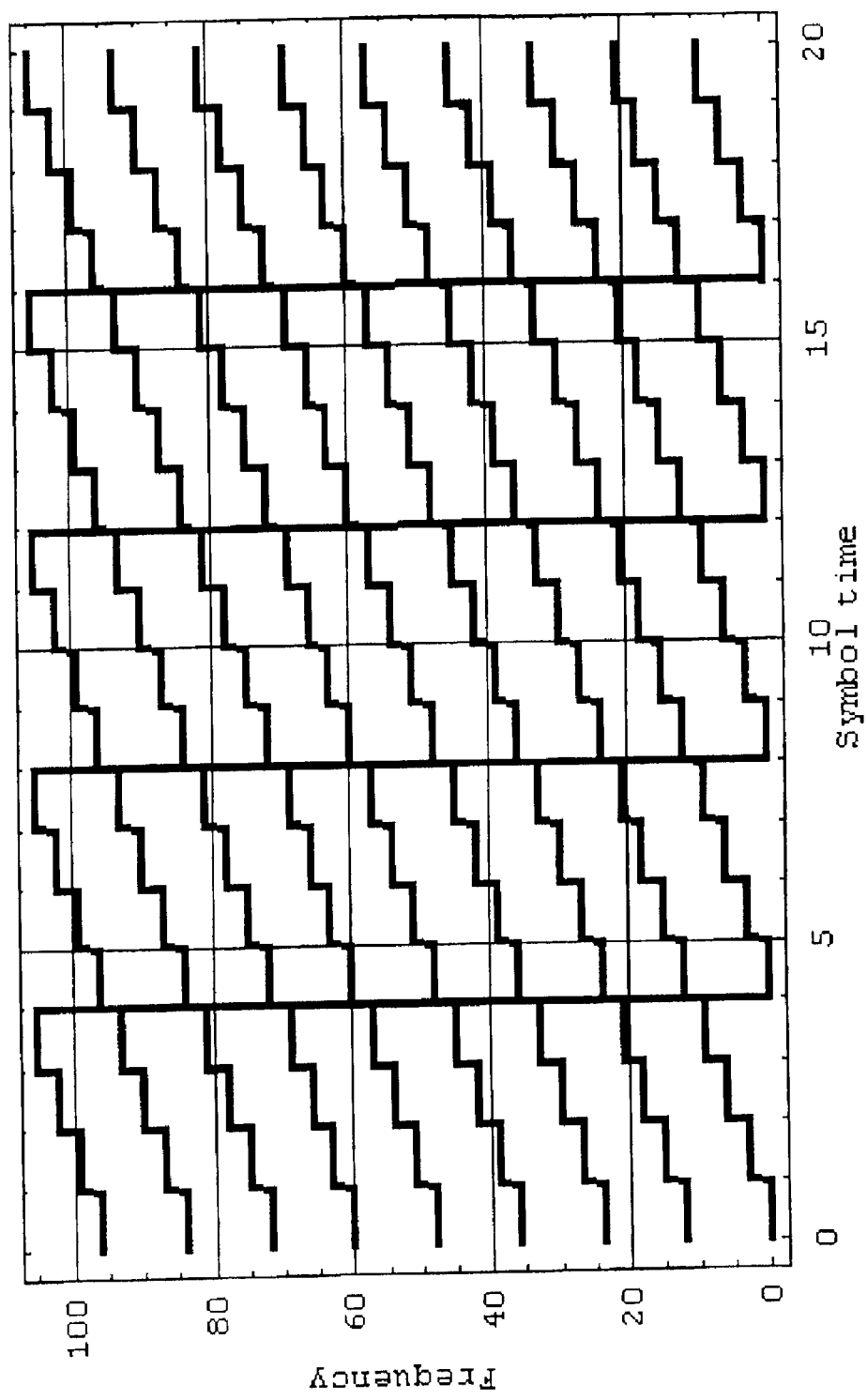
FIG. 7 shows several scattered pilots all transmitting at once.

Within each of the 13 OFDM segments there are 36 scattered pilots. Thus in all 13 segments there are a total of 468 scattered pilots in each wide-band DTV signal. Within an OFDM segment, the scattered pilots change frequency each symbol. The amount of this frequency hop is 3 carriers. The same carrier is transmitted for one symbol with the pattern repeating every 4 symbols. Thus there are several scattered pilots all transmitting at once as shown in FIG. 7. The maximum scattered pilot frequency is 105 in FIG. 7.

As can be seen in FIG. 7, this set of scattered pilots can be viewed as 9 scattered pilots each of which hops by 3 carriers each symbol. A good approximation is 9 "chirp" carriers for each of the 13 segments for a total of 117 scattered pilots in total.

The bandwidth of these scattered pilots is essentially flat over the spectral occupancy region, although it clearly has line components at the period rate of 4 symbols. However, a period of 4 symbols represents a very large distance because of the relatively low symbol rate. Thus the ambiguity caused by the signal is negligible and easily resolved.

The composite scattered pilot signal can be written as s[t] and represented in digital form as with the pseudo-noise signal used in the ATSC delay lock loops and correlators described in patent application Ser. No. 10/210,847, "Position Location Using Broadcast Digital Television Signals" by James J. Spilker, Jr. and Matthew Rabinowitz, filed Jul. 31, 2002. The exact form of the ISDB-T signal is different, but the signal tracking can be performed in a similar manner making use of the reference signal s[t].

The ISDB-T signal is further described in S. Nakahara, et al., "Digital Transmission Scheme for ISDB-T and Reception Characteristics of Digital Terrestrial Television Broadcasting in Japan," IEEE Transactions on Consumer Electronics, August, 1999; and M. Uehara, et al., "Transmission Scheme for the Terrestrial ISDB System," IEEE Transactions on Consumer Electronics, February, 1999.

Autocorrelation Function of a Single Segment

Figure 8:
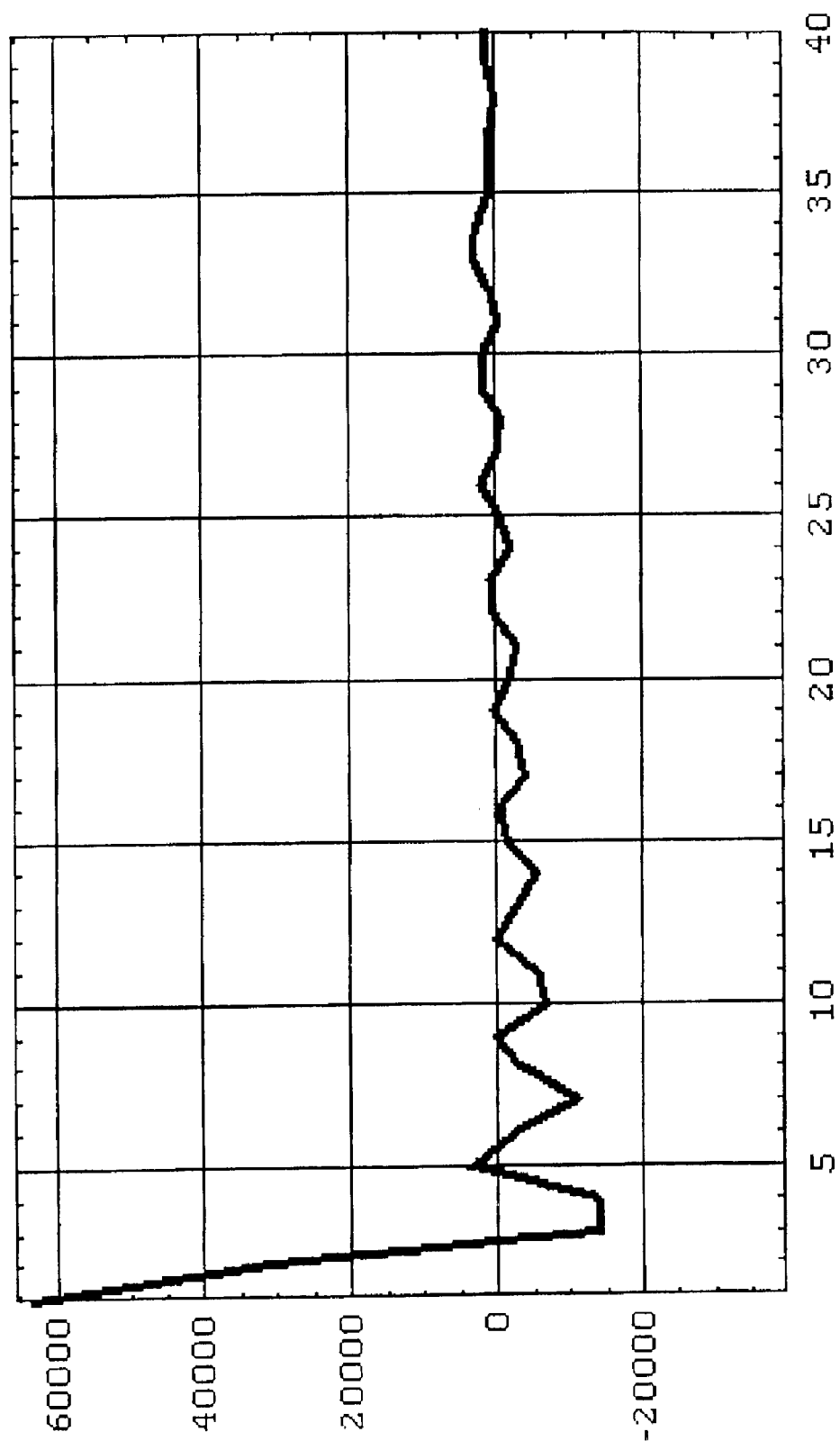
FIG. 8 shows a coherent autocorrelation function.

A single segment of 108 carriers then contains 36 scattered pilots at a frequency spacing of 3 units. The transmitted sequence of tones repeats every 105/3=35 symbols. The coherent autocorrelation function of this signal for a single segment, computed assuming a sample rate of 1/400 symbols, is shown in FIG. 8. The autocorrelation width for a single segment of approximately 430 kHz can give a time resolution of approximately 1 microsecond. Using the full bandwidth of the signal with 13 segments, and correlating over that full frequency region, reduces the autocorrelation peak by the same ratio to approximately 1000/13=77 ns or 77 feet. With sufficient signal-to-noise ratio, and in the absence of multipath errors, a pseudo-range accuracy of approximately 5 meters or better is possible.

Monitor Units

Figure 9:
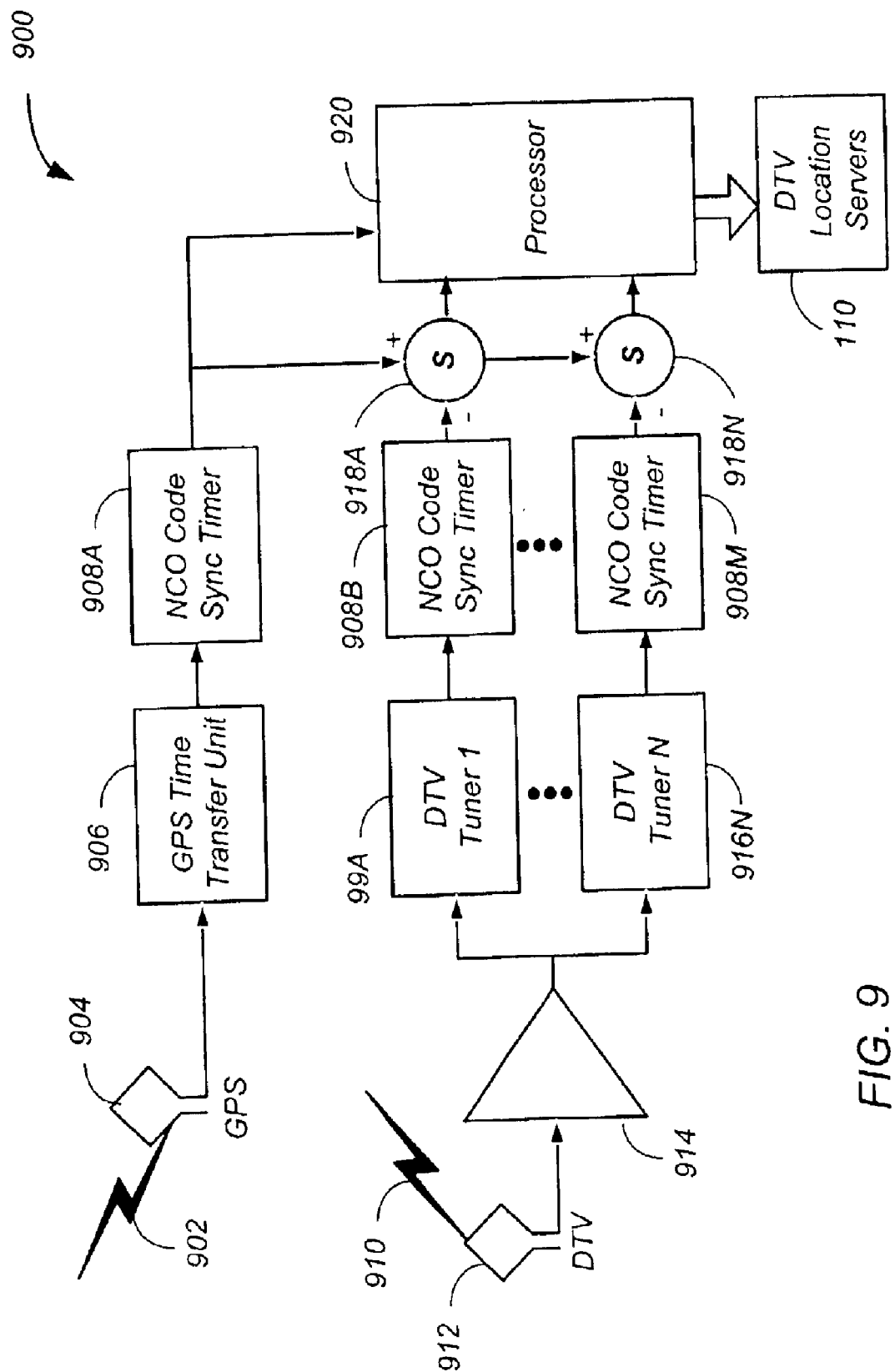
FIG. 9 depicts an implementation of a monitor unit.

FIG. 9 depicts an implementation 900 of monitor unit 108. An antenna 904 receives GPS signals 902. A GPS time transfer unit 906 develops a master clock signal based on the GPS signals. In order to determine the offset of the DTV transmitter clocks, a NCO (numerically controlled oscillator) code synchronization timer 908A develops a master synchronization signal based on the master clock signal. The master synchronization signal can include the ISDB-T scattered pilot carriers. In one implementation, the NCO synchronization timers 908A in all of the monitor units 108 are synchronized to a base date and time. In implementations where a single monitor unit 108 receives DTV signals from all of the same DTV transmitters that user terminal 102 does, it is not necessary to synchronize that monitor unit 108 with any other monitor unit for the purposes of determining the position of user terminal 102. Such synchronization is also unnecessary if all of the monitor stations 108, or all of the DTV transmitters, are synchronized to a common clock.

A DTV antenna 912 receives a plurality of DTV signals 910. In another implementation, multiple DTV antennas are used. An amplifier 914 amplifies the DTV signals. One or more DTV tuners 916A through 916N each tunes to a DTV channel in the received DTV signals to produce a DTV channel signal. Each of a plurality of NCO code synchronization timers 908B through 908M receives one of the DTV channel signals. Each of NCO code synchronization timers 908B through 908M extracts a channel synchronization signal from a DTV channel signal. The channel synchronization signal can include the ISDB-T scattered pilot carriers. In one implementation, the continuous pilot signals and symbol timing within the ISDB-T signal are used as acquisition aids.

Each of a plurality of summers 918A through 918N generates a clock offset between the master synchronization signal and one of the channel synchronization signals. Processor 920 formats and sends the resulting data to DTV location server 110. In one implementation, this data includes, for each DTV channel measured, the identification number of the DTV transmitter, the DTV channel number, the antenna phase center for the DTV transmitter, and the clock offset. This data can be transmitted by any of a number of methods including air link and the Internet. In one implementation, the data is broadcast in spare MPEG packets on the DTV channel itself. The clock offsets for each channel may also be modeled as a function of time.

Software Receivers

One thorough approach to mitigating the effects of multipath is to sample an entire autocorrelation function, rather than to use only early and late samples as in a hardware setup. Multipath effects can be mitigated by selecting the earliest correlation peak.

In the case that position can be computed with a brief delay a simple approach is to use a software receiver, which samples a sequence of the filtered signal, and then processes the sample in firmware on a digital signal processor.

Figure 10:
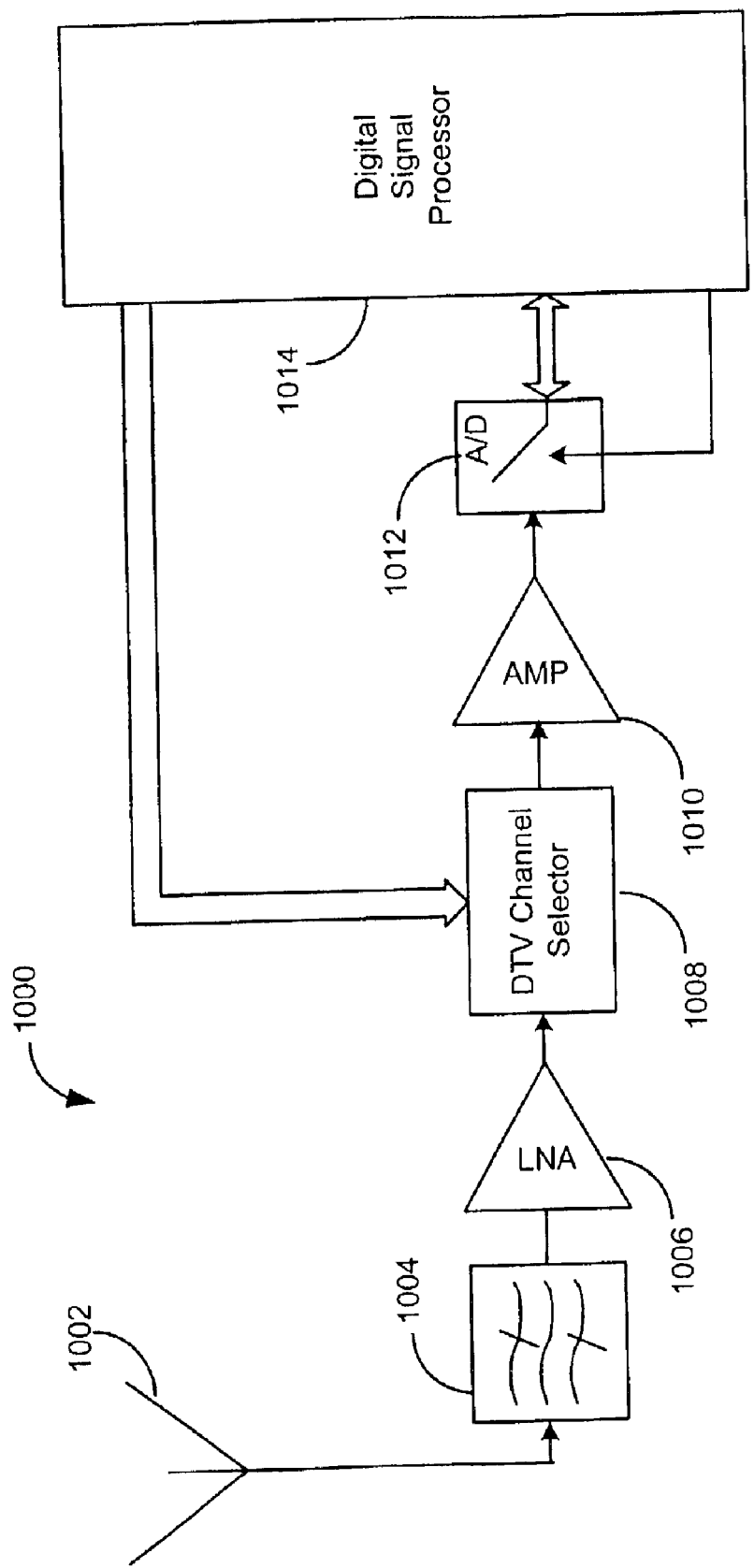
FIG. 10 illustrates one implementation for a software receiver.

FIG. 10 illustrates one implementation 1000 for a software receiver. An antenna 1002 receives a DTV signal. Antenna 1002 can be a magnetic dipole or any other type of antenna capable of receiving DTV signals. A bandpass filter 1004 passes the entire DTV signal spectrum to an LNA 1006. In one implementation, filter 1004 is a tunable bandpass filter that passes the spectrum for a particular DTV channel under the control of a digital signal processor (DSP) 1014.

A low-noise amplifier (LNA) 1006 amplifies and passes the selected signal to a DTV channel selector 1008. DTV channel selector 1008 selects a particular DTV channel under the control of a processor 1014, and filters and downconverts the selected channel signal from UHF (ultra-high frequency) to IF (intermediate frequency) according to conventional methods. An amplifier (AMP) 1010 amplifies the selected IF channel signal. This amplifier may employ automatic gain control (AGC) in order to improve the dynamic range of the architecture. An analog-to-digital converter and sampler (A/D) 1012 produces digital samples of the DTV channel signal $s_{samp}(t)$ and passes these samples to DSP 1014.

Now the processing of the DTV channel signal by DSP 1014 is described for a non-coherent software receiver. A nominal offset frequency for the downconverted sampled signal is assumed. If this signal is downconverted to baseband, the nominal offset is 0 Hz. The process generates the complete autocorrelation function based on sampled signal $s_{samp}(t)$. There are many techniques for the process to be implemented more efficiently such as using a low duty factor reference signal. Let $T_i$ be the period of data sampled, $\omega_{in}$ be the nominal offset of the sampled incident signal, and let $\omega_{offset}$ be the largest possible offset frequency, due to Doppler shift and oscillator frequency drift. The process implements the pseudocode listed below.

$R_{max} = 0$

Create a complex code signal $$s_{code}(t) = C_i(t) + jC_q(t)$$

where $C_i$ is the function describing the in-phase baseband signal and $C_q$ is the function describing the quadrature baseband signal.

Compute $F(s_{code})^*$ where F is the Fourier transform operator, and * is the conjugate operator.

For $\omega = \omega_{in} - \omega_{offset}$ to $\omega_{in} + \omega_{offset}$ step $\dfrac{\pi}{2T_i}$ Create a complex mixing signal $s_{mix}(t) = \cos(\omega t) + j \sin(\omega t)$, $t = [0 \ldots T_i]$ Combine the incident signal $s(t)$ and the mixing signal $s_{mix}(t)$ $s_{comb}(t) = s_{samp}(t) s_{mix}(t)$ Compute the correlation function $R(\tau) = F^{-1}\{F(s_{code})^* F(s_{comb})\}$ If $\max_\tau |R(\tau)| > R_{max}$, $R_{max} \leftarrow \max_\tau |R(\tau)|$, $R_{store}(\tau) = R(\tau)$ Next $\omega$ Upon exit from the process, $R_{store}(\tau)$ will store the correlation between the incident sampled signal $s_{samp}(t)$ and the complex code signal $s_{code}(t)$. $R_{store}(\tau)$ may be further refined by searching over smaller steps of $\omega$. The initial step size for $\omega$ must be less then half the Nyquist rate $$\frac{2\pi}{T_i}.$$

The time offset $\sigma$ that produces the maximum correlation output is used as the pseudo-range.

Alternate Embodiments

The invention can be implemented in digital electronic circuitry, or in computer hardware, firmware, software, or in combinations thereof. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of embodiments of the invention have been described. Nevertheless, it will be understood that various modifications may be made without departing from the spirit and scope of the invention.

For example, although one method for tracking the ISDB-T signal is described, it should be clear that there are several methods of tracking these signals using various forms of conventional delay lock loops and through the use of various types of matched filters.

While implementations of the invention are discussed with reference to the 8 MHz signal, implementations can be used with signals of other bandwidths. Further, implementations of the invention can employ a subset of the bandwidth of the ISDB-T signal. For example, an implementation of the invention can achieve satisfactory results using only 6 MHz of an 8 MHz ISDB-T signal. Implementations of the invention can be extended to use future enhancements to the ISDB-T signal.

Implementations of the present invention exploit the fact that the DTV signal has high power, and can still be tracked by capturing bursts of signal or using a low-duty-factor reference signal which does not use all of the incident signal energy. For example, one implementation employs a time-gated delay-lock loop (DLL) such as that disclosed in J. J. Spilker, Jr., Digital Communications by Satellite, Prentice-Hall, Englewood Cliffs N.J., 1977, Chapter 18-6. Other implementations employ other variations of the DLL, including coherent, non-coherent, and quasi-coherent DLLs, such as those disclosed in J. J. Spilker, Jr., Digital Communications by Satellite, Prentice-Hall, Englewood Cliffs N.J., 1977, Chapter 18 and B. Parkinson and J. Spilker, Jr., Global Positioning System-Theory and Applications, AIAA, Washington, D.C., 1996, Vol. 1, Chapter 17, Fundamentals of Signal Tracking Theory by J. Spilker, Jr. Other implementations employ various types of matched filters, such as a recirculating matched filter.

In some implementations, DTV location server 110 employs redundant signals available at the system level, such as pseudo-ranges available from the DTV transmitters, making additional checks to validate each DTV channel and pseudo-range, and to identify pseudo-ranges of DTV channels that are erroneous. One such technique is conventional receiver autonomous integrity monitoring (RAIM).

Another embodiment of the inventions combines the DTV ranging signals described above with other forms of signals from which a pseudo-range can be computed. For example, a combined use of DTV and GPS satellite signals is described in U.S. patent application Ser. No. 10/159,478, "Position Location using Global Positioning Signals Augmented by Broadcast Television Signals," by Matthew Rabinowitz and James J. Spilker, filed May 31, 2002, the subject matter thereof incorporated herein by reference. Additionally, the DTV signals can be combined with cellular base-station signals or digital radio signals, or any other signal that includes a synchronization code, for a combined position solution.

Accordingly, other embodiments are within the scope of the following claims.

What is claimed is:

1. A method for determining the position of a user terminal, comprising:

receiving at the user terminal a digital television (DTV) broadcast signal from a DTV transmitter, wherein the DTV signal comprises an Integrated Services Digital Broadcasting-Terrestrial (ISDB-T) signal;

determining a pseudo-range between the user terminal and the DTV transmitter based on a known component in the broadcast DTV signal; and determining a position of the user terminal based on the pseudo-range and a location of the DTV transmitter.

2. The method of claim 1, wherein determining a position of the user terminal comprises:

adjusting the pseudo-range based on a difference between a transmitter clock at the DTV transmitter and a known time reference; and determining the position of the user terminal based on the adjusted pseudo-range and the location of the DTV transmitter.

3. The method of claim 1, wherein the known component is a scattered pilot carrier.

4. The method of claim 1, wherein determining a position of the user terminal comprises:

determining an offset between a local time reference in the user terminal and a master time reference; and determining the position of the user terminal based on the pseudo-range, the location of the DTV transmitter, and the offset.

5. The method of claim 4, further comprising:

determining a subsequent position of the user terminal using the offset.

6. The method of claim 1, wherein determining a pseudo-range comprises:

storing a portion of the DTV signal; and subsequently correlating the stored portion and a signal generated by the user terminal to produce the pseudo-range.

7. The method of claim 1, wherein determining a pseudo-range comprises:

correlating the DTV signal with a signal generated by the user terminal as the DTV signal is received to produce the pseudo-range.

8. The method of claim 1, wherein determining a position of the user terminal comprises:

determining a general geographic area within which the user terminal is located; and determining the position of the user terminal based on the pseudo-range and the general geographic area.

9. The method of claim 8, wherein the general geographic area is a footprint of an additional transmitter communicably linked to the user terminal.

10. The method of claim 1, wherein determining a position of the user terminal comprises:

determining a tropospheric propagation velocity in a vicinity of the user terminal;

adjusting the pseudo-range based on the tropospheric propagation velocity; and determining the position of the user terminal based on the adjusted pseudo-range and the location of the DTV transmitter.

11. The method of claim 1, wherein determining a position of the user terminal comprises:

adjusting the pseudo-range based on a terrain elevation in a vicinity of the user terminal; and determining the position of the user terminal based on the adjusted pseudo-range and the location of the DTV transmitter.

12. The method of claim 1, further comprising:

selecting the DTV signal from a plurality of DTV signals based on an identity of an additional transmitter communicably linked to the user terminal and a stored table correlating the additional transmitter and the DTV signals.

13. The method of claim 1, further comprising:

accepting a location input from a user; and selecting the DTV signal from a plurality of DTV signals based on the location input.

14. The method of claim 1, further comprising:

scanning available DTV signals to assemble a fingerprint of the location; and selecting the DTV signal used to determine the pseudo-range from the available DTV signals based on the fingerprint and a stored table that matches known fingerprints with known locations.

15. The method of claim 1, further comprising:
using receiver autonomous integrity monitoring (RAIM) to check the integrity of the pseudo-range based on a redundant pseudo-range from the DTV transmitter.

16. A method for determining the position of a user terminal, comprising:
receiving at the user terminal a digital television (DTV) broadcast signal from a DTV transmitter, wherein the DTV signal comprises a European Telecommunications Standards Institute (ETSI) Digital Video Broadcasting-Terrestrial (ISDB-T) signal;
determining a pseudo-range between the user terminal and the DTV transmitter based on the DTV broadcast signal; and
transmitting the pseudo-range to a location server configured to determine a position of the user terminal based on the pseudo-range and a location of the DTV transmitter.

17. The method of claim 16, wherein determining a pseudo-range comprises:
determining a time of transmission from the DTV transmitter of a known component of the DTV broadcast signal;
determining a time of reception at the user terminal of the known component; and
determining the difference between the time of transmission and the time of reception.

18. The method of claim 16, wherein the known component is a scattered pilot carrier.

19. The method of claim 16, wherein determining a pseudo-range comprises:
storing a portion of the DTV signal; and
subsequently correlating the stored portion and a signal generated by the user terminal to produce the pseudo-range.

20. The method of claim 16, wherein determining a pseudo-range comprises:
correlating the DTV signal with a signal generated by the user terminal as the DTV signal is received to produce the pseudo-range.

21. A method for determining the position of a user terminal, comprising:
receiving a pseudo-range from a user terminal, the pseudo-range determined between the user terminal and a DTV transmitter based on a DTV signal broadcast by the DTV transmitter, wherein the DTV signal comprises a European Telecommunications Standards Institute (ETSI) Digital Video Broadcasting-Terrestrial (ISDB-T) signal, and wherein the pseudo-range is determined based on a known component in the ISDB-T signal; and
determining a position of the user terminal based on the pseudo-range and a location of the DTV transmitter.

22. The method of claim 21, wherein determining a position of the user terminal comprises:
adjusting the pseudo-range based on a difference between a transmitter clock at the DTV transmitter and a known time reference; and
determining the position of the user terminal based on the adjusted pseudo-range and the location of the DTV transmitter.

23. The method of claim 21, wherein the known component is a scattered pilot carrier.

24. The method of claim 21, wherein determining a position of the user terminal comprises:
determining an offset between a local time reference in the user terminal and a master time reference; and
determining the position of the user terminal based on the pseudo-range, the location of the DTV transmitter, and the offset.

25. The method of claim 24, further comprising:
determining a subsequent position of the user terminal using the offset.

26. The method of claim 21, wherein determining a position of the user terminal comprises:
determining a general geographic area within which the user terminal is located; and
determining the position of the user terminal based on the pseudo-range and the general geographic area.

27. The method of claim 26, wherein the general geographic area is a footprint of an additional transmitter communicably linked to the user terminal.

28. The method of claim 21, wherein determining a position of the user terminal comprises:
determining a tropospheric propagation velocity in a vicinity of the user terminal;
adjusting the pseudo-range based on the tropospheric propagation velocity; and
determining the position of the user terminal based on the adjusted pseudo-range and the location of the DTV transmitter.

29. The method of claim 21, wherein determining a position of the user terminal comprises:
adjusting the pseudo-range based on the terrain elevation in the vicinity of the user terminal; and
determining the position of the user terminal based on the adjusted pseudo-range and the location of the DTV transmitter.

30. An apparatus for determining the position of a user terminal, comprising:
means for receiving at the user terminal a digital television (DTV) broadcast signal from a DTV transmitter, wherein the DTV signal comprises a European Telecommunications Standards Institute (ETSI) Digital Video Broadcasting-Terrestrial (ISDB-T) signal;
means for determining a pseudo-range between the user terminal and the DTV transmitter based on a known component in the DTV broadcast signal; and
means for determining a position of the user terminal based on the pseudo-range and a location of the DTV transmitter.

31. The apparatus of claim 30, wherein the means for determining a position of the user terminal comprises:
means for adjusting the pseudo-range based on a difference between a transmitter clock at the DTV transmitter and a known time reference; and
means for determining the position of the user terminal based on the adjusted pseudo-range and the location of the DTV transmitter.

32. The apparatus of claim 31, wherein the known component is a scattered pilot carrier.

33. The apparatus of claim 30, wherein the means for determining a position of the user terminal comprises:
means for determining an offset between a local time reference in the user terminal and a master time reference; and means for determining the position of the user terminal based on the pseudo-range, the location of the DTV transmitter, and the offset.

34. The apparatus of claim 33, further comprising:
means for determining a subsequent position of the user terminal using the offset.

35. The apparatus of claim 30, wherein the means for determining a pseudo-range comprises:
means for storing a portion of the DTV signal; and
means for subsequently correlating the stored portion and a signal generated by the user terminal to produce the pseudo-range.

36. The apparatus of claim 30, wherein the means for determining a pseudo-range comprises:
means for correlating the DTV signal with a signal generated by the user terminal as the DTV signal is received to produce the pseudo-range.

37. The apparatus of claim 30, wherein the means for determining a position of the user terminal comprises:
means for determining a general geographic area within which the user terminal is located; and
means for determining the position of the user terminal based on the pseudo-range and the general geographic area.

38. The apparatus of claim 37, wherein the general geographic area is a footprint of an additional transmitter communicably linked to the user terminal.

39. The apparatus of claim 30, wherein the means for determining a position of the user terminal comprises:
means for determining a tropospheric propagation velocity in the vicinity of the user terminal;
means for adjusting the pseudo-range based on the tropospheric propagation velocity; and
means for determining the position of the user terminal based on the adjusted pseudo-range and the location of the DTV transmitter.

40. The apparatus of claim 30, wherein the means for determining a position of the user terminal comprises:
means for adjusting each pseudo-range based on a terrain elevation in a vicinity of the user terminal; and
means for determining the position of the user terminal based on the adjusted pseudo-range and the location of the DTV transmitter.

41. The apparatus of claim 30, further comprising:
means for selecting the DTV signal from a plurality of DTV signals based on an identity of an additional transmitter communicably linked to the user terminal and a stored table correlating the additional transmitter and the DTV signals.

42. The apparatus of claim 30, further comprising:
means for accepting a location input from a user; and
means for selecting the DTV signal from a plurality of DTV signals based on the location input.

43. The apparatus of claim 30, further comprising:
means for scanning available DTV signals to assemble a fingerprint of the location; and
means for selecting the DTV broadcast signal used to determine the pseudo-range from the available DTV signals based on the fingerprint and a stored table that matches known fingerprints with known locations.

44. The apparatus of claim 30, further comprising:
means for using receiver autonomous integrity monitoring (RAIM) to check the integrity of the pseudo-range based on a redundant pseudo-range from the DTV transmitter.

45. An apparatus for determining the position of a user terminal, comprising:
means for receiving at the user terminal a digital television (DTV) broadcast signal from a DTV transmitter, wherein the DTV signal comprises a European Telecommunications Standards Institute (ETSI) Digital Video Broadcasting-Terrestrial (ISDB-T) signal;
means for determining a pseudo-range between the user terminal and the DTV transmitter based on a known component in the DTV broadcast signal; and
means for transmitting the pseudo-range to a location server configured to determine a position of the user terminal based on the pseudo-range and a location of the DTV transmitter.

46. The apparatus of claim 45, wherein the means for determining a pseudo-range comprises:
means for determining a time of transmission from the DTV transmitter of a component of the DTV broadcast signal;
means for determining a time of reception at the user terminal of the component; and
means for determining the difference between the time of transmission and the time of reception.

47. The apparatus of claim 45, wherein the component is a scattered pilot carrier.

48. The apparatus of claim 45, wherein the means for determining a pseudo-range comprises:
means for storing a portion of the DTV signal; and
means for subsequently correlating the stored portion and a signal generated by the user terminal to produce the pseudo-range.

49. The apparatus of claim 45, wherein the means for determining a pseudo-range comprises:
means for correlating the DTV signal with a signal generated by the user terminal as the DTV signal is received to produce the pseudo-range.

50. An apparatus for determining the position of a user terminal, comprising:
means for receiving a pseudo-range from a user terminal, the pseudo-range determined between the user terminal and a DTV transmitter based on a DTV signal broadcast by the DTV transmitter, wherein the DTV signal comprises a European Telecommunications Standards Institute (ETSI) Digital Video Broadcasting-Terrestrial (ISDB-T) signal, and wherein the pseudo-range is determined based on a known component in the DTV signal; and
means for determining a position of the user terminal based on the pseudo-range and a location of the DTV transmitter.

51. The apparatus of claim 50, wherein the means for determining a position of the user terminal comprises:
means for adjusting the pseudo-range based on a difference between a transmitter clock at the DTV transmitter and a known time reference; and
means for determining the position of the user terminal based on the adjusted pseudo-range and the location of the DTV transmitter.

52. The apparatus of claim 50, wherein the known component is a scattered pilot carrier.

53. The apparatus of claim 50, wherein the means for determining a position of the user terminal comprises:
means for determining an offset between a local time reference in the user terminal and a master time reference; and means for determining the position of the user terminal based on the pseudo-range, the location of the DTV transmitter, and the offset.

54. The apparatus of claim 53, further comprising:
means for determining a subsequent position of the user terminal using the offset.

55. The apparatus of claim 50, wherein the means for determining a position of the user terminal comprises:
means for determining a general geographic area within which the user terminal is located; and
means for determining the position of the user terminal based on the pseudo-range and the general geographic area.

56. The apparatus of claim 55, wherein the general geographic area is a footprint of an additional transmitter communicably linked to the user terminal.

57. The apparatus of claim 50, wherein the means for determining a position of the user terminal comprises:
means for determining a tropospheric propagation velocity in a vicinity of the user terminal;
means for adjusting the pseudo-range based on the tropospheric propagation velocity; and
means for determining the position of the user terminal based on the adjusted pseudo-range and the location of the DTV transmitter.

58. The apparatus of claim 50, wherein the means for determining a position of the user terminal comprises:
means for adjusting the pseudo-range based on the terrain elevation in the vicinity of the user terminal; and
means for determining the position of the user terminal based on the adjusted pseudo-range and the location of the DTV transmitter.

59. A computer program product, tangibly stored on a computer-readable medium, for determining the position of a user terminal, comprising instructions operable to cause a programmable processor to:
receive at the user terminal a digital television (DTV) broadcast signal from a DTV transmitter, wherein the DTV signal comprises a European Telecommunications Standards Institute (ETSI) Digital Video Broadcasting-Terrestrial (ISDB-T) signal;
determine a pseudo-range between the user terminal and the DTV transmitter based on a known component in the DTV broadcast signal; and
determine a position of the user terminal based on the pseudo-range and a location of the DTV transmitter.

60. The computer program product of claim 59, wherein the instructions operable to cause a programmable processor to determine a position of the user terminal comprise instructions operable to cause a programmable processor to:
adjust the pseudo-range based on a difference between a transmitter clock at the DTV transmitter and a known time reference; and
determine the position of the user terminal based on the adjusted pseudo-range and the location of the DTV transmitter.

61. The computer program product of claim 59, wherein the known component is a scattered pilot carrier.

62. The computer program product of claim 59, wherein the instructions operable to cause a programmable processor to determine a position of the user terminal comprise instructions operable to cause a programmable processor to:
determine an offset between a local time reference in the user terminal and a master time reference; and
determine the position of the user terminal based on the pseudo-range, the location of the DTV transmitter, and the offset.

63. The computer program product of claim 62, further comprising instructions operable to cause a programmable processor to:
determine a subsequent position of the user terminal using the offset.

64. The computer program product of claim 59, wherein the instructions operable to cause a programmable processor to determine a pseudo-range comprise instructions operable to cause a programmable processor to:
store a portion of the DTV signal; and
subsequently correlate the stored portion and a signal generated by the user terminal to produce the pseudo-range.

65. The computer program product of claim 59, wherein the instructions operable to cause a programmable processor to determine a pseudo-range comprise instructions operable to cause a programmable processor to:
correlate the DTV signal with a signal generated by the user terminal as the DTV signal is received to produce the pseudo-range.

66. The computer program product of claim 59, wherein the instructions operable to cause a programmable processor to determine a position of the user terminal comprise instructions operable to cause a programmable processor to:
determine a general geographic area within which the user terminal is located; and
determine the position of the user terminal based on the pseudo-range and the general geographic area.

67. The computer program product of claim 66, wherein the general geographic area is a footprint of an additional transmitter communicably linked to the user terminal.

68. The computer program product of claim 59, wherein the instructions operable to cause a programmable processor to determine a position of the user terminal comprise instructions operable to cause a programmable processor to
determine a tropospheric propagation velocity in a vicinity of the user terminal;
adjust the pseudo-range based on the tropospheric propagation velocity; and
determine the position of the user terminal based on the adjusted pseudo-range and the location of the DTV transmitter.

69. The computer program product of claim 59, wherein the instructions operable to cause a programmable processor to determine a position of the user terminal comprise instructions operable to cause a programmable processor to:
adjust the pseudo-range based on the terrain elevation in the vicinity of the user terminal; and
determine the position of the user terminal based on the adjusted pseudo-range and the location of the DTV transmitter.

70. The computer program product of claim 59, further comprising instructions operable to cause a programmable processor to:
select the DTV signal from a plurality of DTV signals based on an identity of an additional transmitter communicably linked to the user terminal and a stored table correlating the additional transmitter and the DTV signals.

71. The computer program product of claim 59, further comprising instructions operable to cause a programmable processor to:
accept a location input from a user; and
select the DTV signal from a plurality of DTV signals based on the location input.

72. The computer program product of claim 59, further comprising instructions operable to cause a programmable processor to:
scan available DTV signals to assemble a fingerprint of the location; and
select the DTV broadcast signal used to determine the pseudo-range from the available DTV signals based on the fingerprint and a stored table that matches known fingerprints with known locations.

73. The computer program product of claim 59, further comprising instructions operable to cause a programmable processor to:
use receiver autonomous integrity monitoring (RAIM) to check the integrity of the pseudo-range based on a redundant pseudo-range from the DTV transmitter.

74. A computer program product, tangibly stored on a computer-readable medium, for determining the position of a user terminal, comprising instructions operable to cause a programmable processor to:
receive at the user terminal a digital television (DTV) broadcast signal from a DTV transmitter, wherein the DTV signal comprises a European Telecommunications Standards Institute (ETSI) Digital Video Broadcasting-Terrestrial (ISDB-T) signal;
determine a pseudo-range between the user terminal and the DTV transmitter based on a known component in the DTV broadcast signal; and
transmit the pseudo-range to a location server configured to determine a position of the user terminal based on the pseudo-range and a location of the DTV transmitter.

75. The computer program product of claim 74, wherein the instructions operable to cause a programmable processor to determine a pseudo-range comprise instructions operable to cause a programmable processor to:
determine a time of transmission from the DTV transmitter of a component of the DTV broadcast signal;
determine a time of reception at the user terminal of the component; and
determining the difference between the time of transmission and the time of reception.

76. The computer program product of claim 74, wherein the component is a scattered pilot carrier.

77. The computer program product of claim 74, wherein the instructions operable to cause a programmable processor to determine a pseudo-range comprise instructions operable to cause a programmable processor to:
store a portion of the DTV signal; and
subsequently correlate the stored portion and a signal generated by the user terminal to produce the pseudo-range.

78. The computer program product of claim 74, wherein the instructions operable to cause a programmable processor to determine a pseudo-range comprise instructions operable to cause a programmable processor to:
correlate the DTV signal with a signal generated by the user terminal as the DTV signal is received to produce the pseudo-range.

79. A computer program product, tangibly stored on a computer-readable medium, for determining the position of a user terminal, comprising instructions operable to cause a programmable processor to:
receive a pseudo-range from a user terminal, the pseudo-range determined between the user terminal and a DTV transmitter based on a DTV signal broadcast by the DTV transmitter, wherein the DTV signal comprises a European Telecommunications Standards Institute (ETSI) Digital Video Broadcasting-Terrestrial (ISDB-T) signal, and wherein the pseudo-range is determined based on a known component in the DTV signal; and
determine a position of the user terminal based on the pseudo-range and a location of the DTV transmitter.

80. The computer program product of claim 79, wherein the instructions operable to cause a programmable processor to determine a position of the user terminal comprise instructions operable to cause a programmable processor to:
adjust the pseudo-range based on a difference between a transmitter clock at the DTV transmitter and a known time reference; and
determine the position of the user terminal based on the adjusted pseudo-range and the location of the DTV transmitter.

81. The computer program product of claim 79, wherein the known component is a scattered pilot carrier.

82. The computer program product of claim 79, wherein the instructions operable to cause a programmable processor to determine a position of the user terminal comprise instructions operable to cause a programmable processor to:
determine an offset between a local time reference in the user terminal and a master time reference; and
determine the position of the user terminal based on the pseudo-range, the location of the DTV transmitter, and the offset.

83. The computer program product of claim 82, further comprising instructions operable to cause a programmable processor to:
determine a subsequent position of the user terminal using the offset.

84. The computer program product of claim 79, wherein the instructions operable to cause a programmable processor to determine a position of the user terminal comprise instructions operable to cause a programmable processor to:
determine a general geographic area within which the user terminal is located; and
determine the position of the user terminal based on the pseudo-range and the general geographic area.

85. The computer program product of claim 84, wherein the general geographic area is a footprint of an additional transmitter communicably linked to the user terminal.

86. The computer program product of claim 79, wherein the instructions operable to cause a programmable processor to determine a position of the user terminal comprise instructions operable to cause a programmable processor to:
determine a tropospheric propagation velocity in the vicinity of the user terminal;
adjust the pseudo-range based on the tropospheric propagation velocity; and
determine the position of the user terminal based on the adjusted pseudo-range and the location of the DTV transmitter.

87. The computer program product of claim 79, wherein the instructions operable to cause a programmable processor to determine a position of the user terminal comprise instructions operable to cause a programmable processor to:
adjust the pseudo-range based on the terrain elevation in the vicinity of the user terminal; and
determine the position of the user terminal based on the adjusted pseudo-range and the location of the DTV transmitter.

* * * * *

UNITED STATES PATENT AND TRADEMARK OFFICE
CERTIFICATE OF CORRECTION

| | | |
|---|---|---|
| PATENT NO. | : 6,952,182 B2 | Page 1 of 1 |
| APPLICATION NO. | : 10/290984 | |
| DATED | : October 4, 2005 | |
| INVENTOR(S) | : Spilker, Jr. et al. | |

It is certified that error appears in the above-identified patent and that said Letters Patent is hereby corrected as shown below:

On the title page:
In the References Cited section (56) of the first page, under the U.S. Patent Documents sub-section, insert:
Column 2, line 3:
--5,604,765   A         2/1997   Bruno et al.-- and

--6,590,529   B2        7/2003   Schwoegler--

In the References Cited section (56) of the first page, under the the Other Publications sub-section, replace "XPO1052087"

with

--XPO10520871--

Signed and Sealed this

Twenty-second Day of August, 2006

JON W. DUDAS
*Director of the United States Patent and Trademark Office*

UNITED STATES PATENT AND TRADEMARK OFFICE
CERTIFICATE OF CORRECTION

PATENT NO. : 6,952,182 B2  Page 1 of 1
APPLICATION NO. : 10/290984
DATED : October 4, 2005
INVENTOR(S) : Spilker, Jr. et al.

It is certified that error appears in the above-identified patent and that said Letters Patent is hereby corrected as shown below:

ON THE TITLE PAGE, ITEM (73), REPLACE "ROSOM" WITH --ROSUM--

Signed and Sealed this

Eighteenth Day of May, 2010

David J. Kappos
*Director of the United States Patent and Trademark Office*